(12) United States Patent
Tsubonoya

(10) Patent No.: US 11,733,499 B2
(45) Date of Patent: Aug. 22, 2023

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventor: Keisuke Tsubonoya, Yokohama (JP)

(73) Assignee: Nikon Corooration, Tokyo (JP)

(*) Notice: Subject to any disclaimer, the term of this patent is extended or adjusted under 35 U.S.C. 154(b) by 25 days.

(21) Appl. No.: 17/624,827

(22) PCT Filed: Jun. 19, 2020

(86) PCT No.: PCT/JP2020/024055
§ 371 (c)(1),
(2) Date: Jan. 4, 2022

(87) PCT Pub. No.: WO2021/006002
PCT Pub. Date: Jan. 14, 2021

(65) Prior Publication Data
US 2022/0283415 A1    Sep. 8, 2022

(30) Foreign Application Priority Data

Jul. 9, 2019   (JP) ................................ 2019-127589
Jul. 9, 2019   (JP) ................................ 2019-127590
Jul. 9, 2019   (JP) ................................ 2019-127591

(51) Int. Cl.
G02B 15/22          (2006.01)

(52) U.S. Cl.
CPC .................................. *G02B 15/22* (2013.01)

(58) Field of Classification Search
CPC . G02B 1/11; G02B 9/64; G02B 13/18; G02B 15/144111; G02B 15/145127; G02B 15/145523; G02B 15/145527; G02B 15/22
See application file for complete search history.

(56) References Cited

U.S. PATENT DOCUMENTS

| 4,508,433 A | 4/1985 | Kitagishi et al. |
| 4,576,448 A | 3/1986 | Ikari |
| 2019/0339497 A1 | 11/2019 | Gyoda |

FOREIGN PATENT DOCUMENTS

| JP | S55-140810 A | 11/1980 |
| JP | S58-219509 A | 12/1983 |

(Continued)

OTHER PUBLICATIONS

Office Action dated Sep. 6, 2022, in Japanese Patent Application No. 2021-530564.

(Continued)

*Primary Examiner* — Jack Dinh
(74) *Attorney, Agent, or Firm* — Potomac Law Group, PLLC

(57) ABSTRACT

An optical system (ZL(1)) comprises a plurality of lens groups including a first focusing lens group (G2) and a second focusing lens group (G4) that are disposed side by side on an optical axis, and the second focusing lens group (G4) is disposed at a position closer to an image surface than the first focusing lens group (G2). The first focusing lens group (G2) has positive refractive power, and moves toward an object along the optical axis from focusing on an infinite-distance object to focusing on a short-distance object. The second focusing lens group (G4) moves toward the image surface along the optical axis from focusing on the infinite-distance object to focusing on the short-distance object. The optical system (ZL(1)) satisfies the following conditional expression. $-020 < \beta F1/\beta F2 < 0.50$ where $\beta F1$ is the lateral magnification of the first focusing lens group at the time of focusing on the infinite-distance object, and $\beta F2$ is the lateral magnification of the second focusing lens group at the time of focusing on the infinite-distance object.

25 Claims, 18 Drawing Sheets

(56) References Cited

FOREIGN PATENT DOCUMENTS

| | | |
|---|---|---|
| JP | H11-316341 A | 11/1999 |
| JP | 2011-180218 A | 9/2011 |
| JP | 2015-034899 A | 2/2015 |
| JP | 2017-102354 A | 6/2017 |
| JP | 2017-223754 A | 12/2017 |
| JP | 2019-090949 A | 6/2019 |
| JP | 2019-194630 A | 11/2019 |
| JP | 2020-064123 A | 4/2020 |
| WO | WO 2018/135000 A1 | 7/2018 |

OTHER PUBLICATIONS

International Preliminary Report on Patentability from International Patent Application No. PCT/JP2020/024055, dated Jan. 20, 2022.
International Search Report from International Patent Application No. PCT/JP2020/024055, dated Sep. 15, 2020.

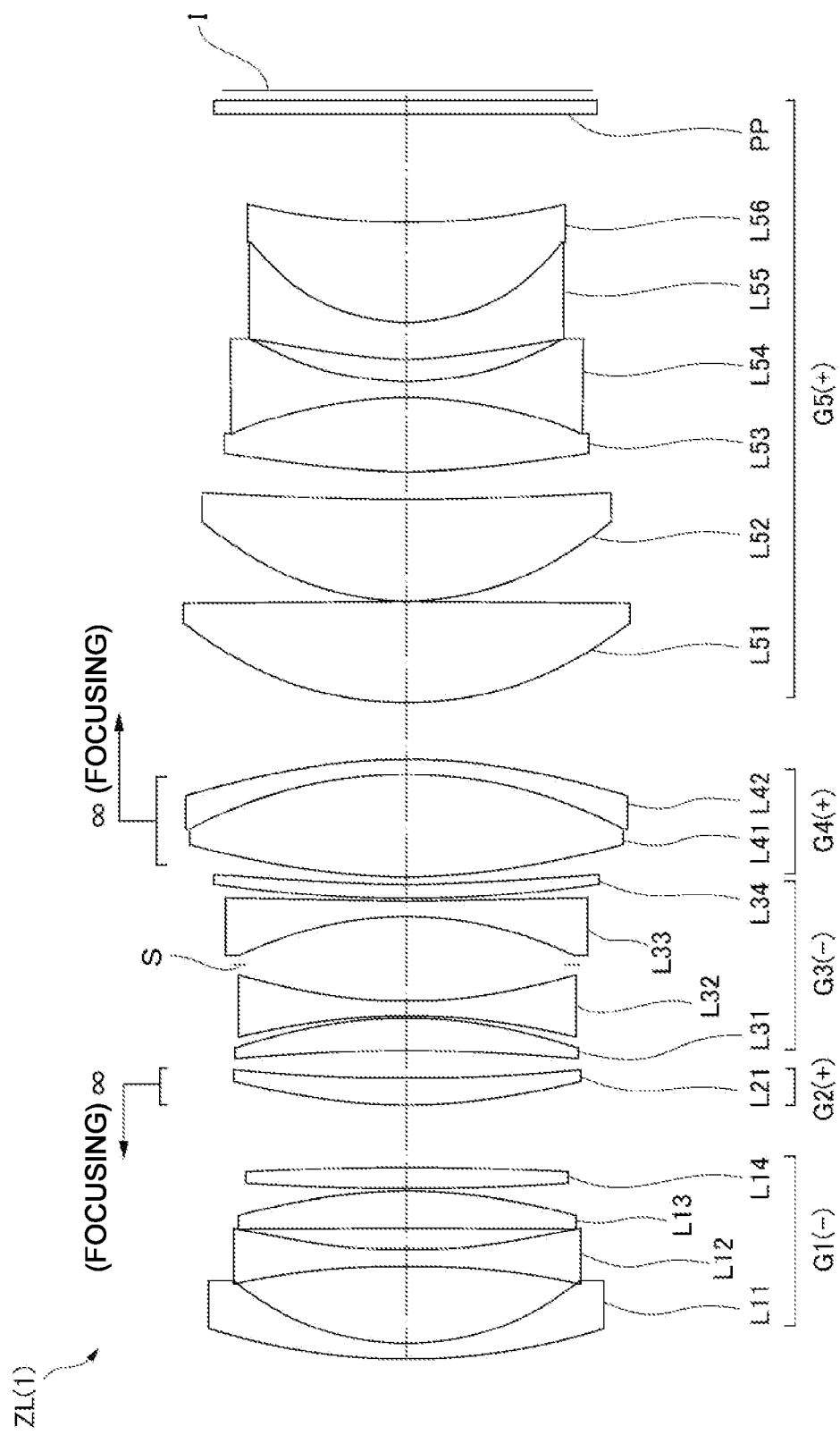

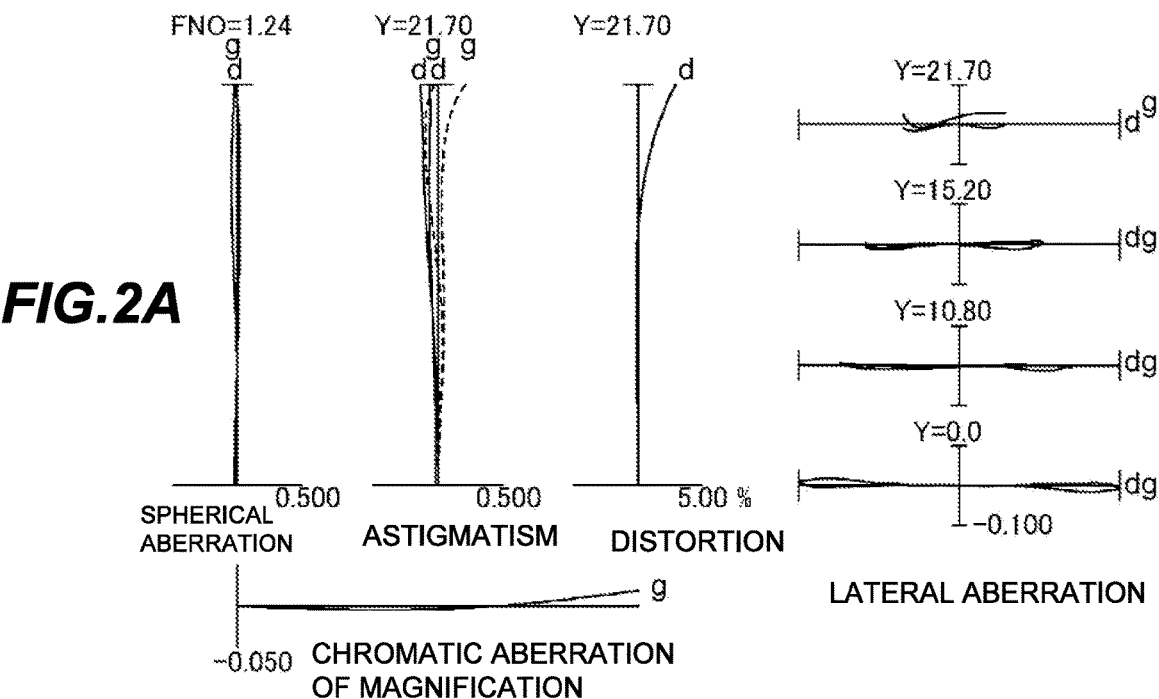
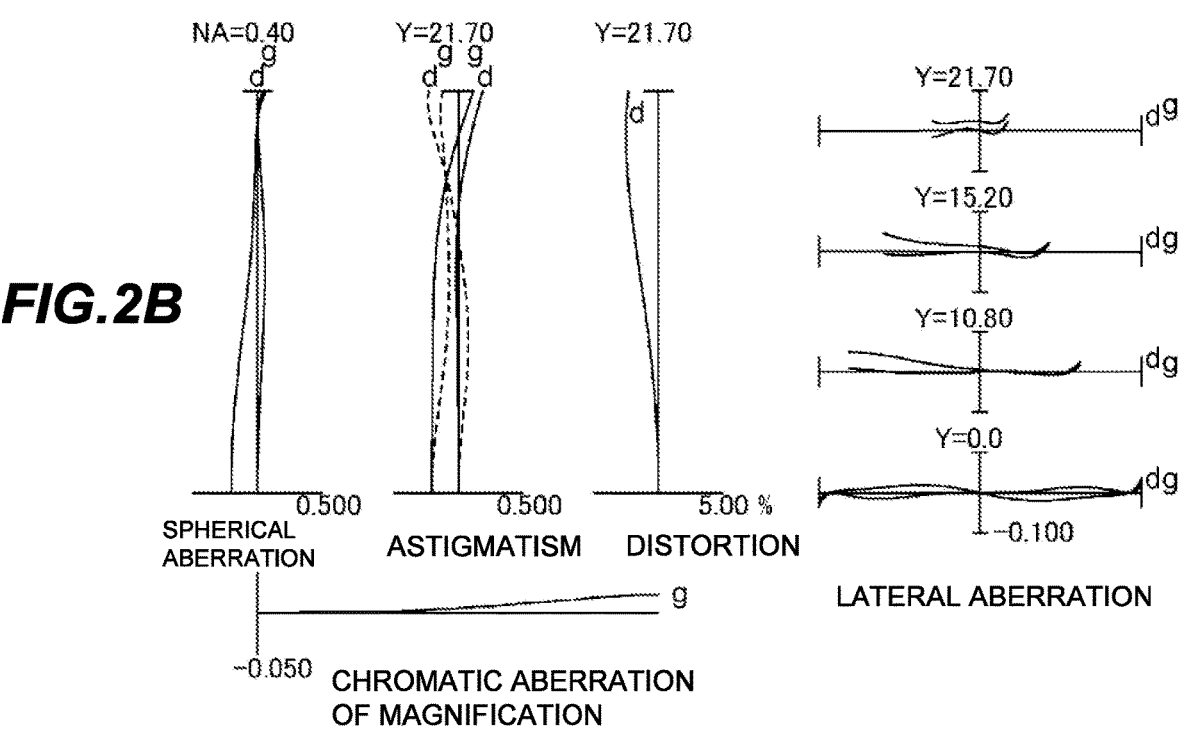

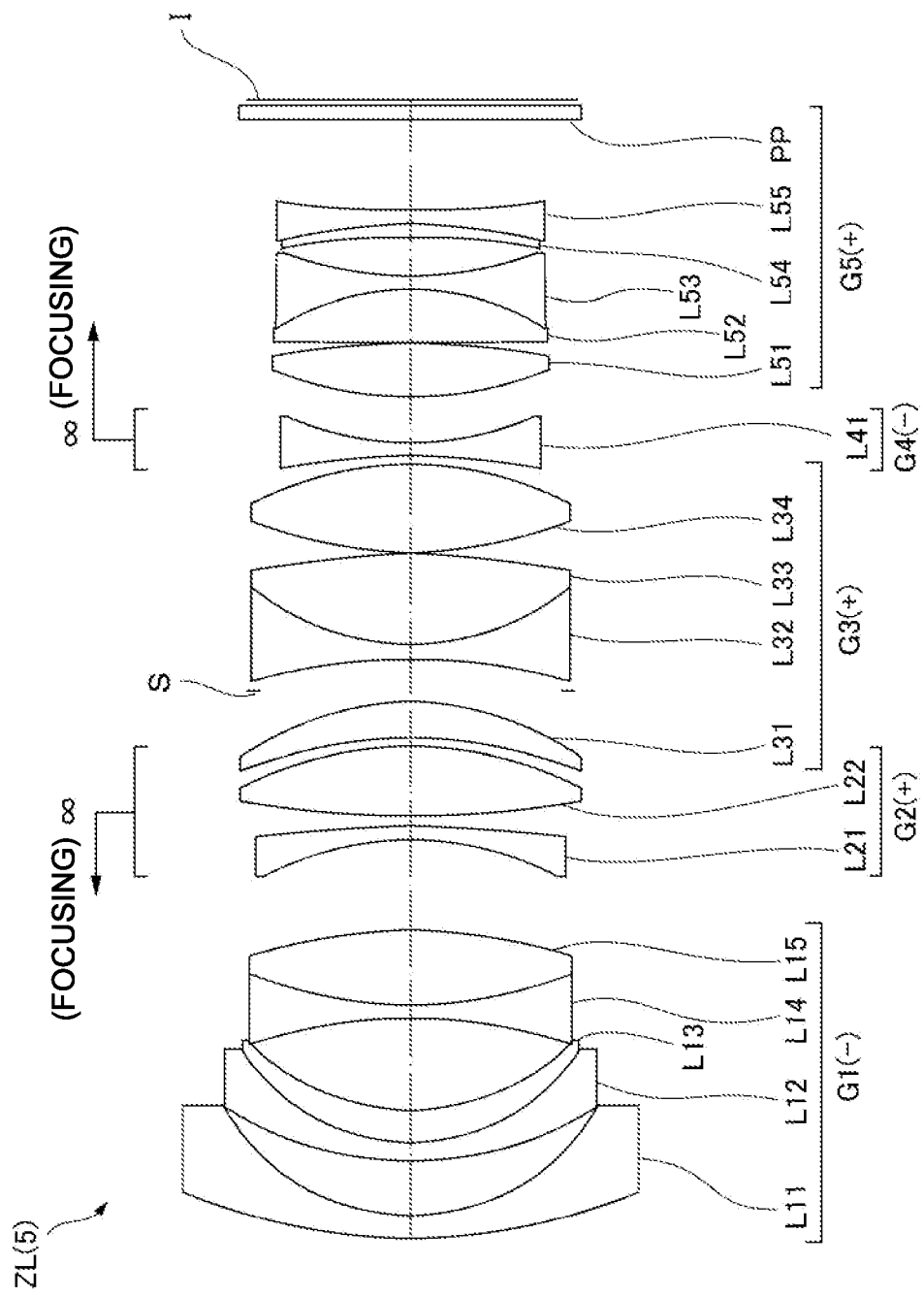

OPTICAL SYSTEM, OPTICAL APPARATUS AND METHOD FOR MANUFACTURING THE OPTICAL SYSTEM

TECHNICAL FIELD

The present invention relates to an optical system, an optical apparatus, and a method for manufacturing the optical system.

TECHNICAL BACKGROUND

Optical apparatuses such as digital still cameras, film cameras, and video cameras have had problems in miniaturization of optical systems and suppression of various aberrations (see, for example, Patent literature 1).

PRIOR ARTS LIST

Patent Document

Patent literature 1: Japanese Laid-Open Patent Publication No. 2011-180218(A)

SUMMARY OF THE INVENTION

In order to solve the above problems, the present invention proposes an optical system described below and an optical apparatus in which the optical system is installed.

An optical system according to the present invention consists of a plurality of lens groups including a first focusing lens group and a second focusing lens group which are arranged along an optical axis, and the second focusing lens group is provided at a position closer to an image surface than the first focusing lens group. The first focusing lens group has positive refractive power and moves in a direction to an object along the optical axis upon focusing on from an infinity object to a short distant object, and the second focusing lens group moves in a direction to an image surface along the optical axis upon focusing on from an infinity object to a short distant object. The following conditional expression is satisfied:

$$-0.20 < \beta F1/\beta F2 < 0.50,$$

where $\beta F1$: a lateral magnification of the first focusing lens group upon focusing on the infinity object, and $\beta F2$: a lateral magnification of the second focusing lens group upon focusing on the infinity object.

BRIEF DESCRIPTION OF THE DRAWINGS

FIG. 1 is a diagram showing a lens configuration of an optical system according to Example 1;

FIGS. 2A and 2B are diagrams of various aberrations of the optical system according to the Example 1, where FIG. 2A shows various aberrations upon focusing on an infinity object, and FIG. 2B shows various aberrations upon focusing on a short distant object;

FIG. 4A shows various aberrations upon focusing on an infinity object, and FIG. 4B shows various aberrations upon focusing on a short distant object;

FIG. 6A shows various aberrations upon focusing on an infinity object, and FIG. 6B shows various aberrations upon focusing on a short distant object;

FIG. 8A shows various aberrations upon focusing on an infinity object, and FIG. 8B shows various aberrations upon focusing on a short distant object;

FIG. 9 is a diagram showing a lens configuration of an optical system according to Example 5;

FIG. 10A shows various aberrations upon focusing on an infinity object, and FIG. 10B shows various aberrations upon focusing on a short distant object;

FIG. 12A shows various aberrations upon focusing on an infinity object, and FIG. 12B shows various aberrations upon focusing on a short distant object;

FIG. 14A shows various aberrations upon focusing on an infinity object, and FIG. 14B shows various aberrations upon focusing on a short distant object;

FIG. 16A shows various aberrations upon focusing on an infinity object, and FIG. 16B shows various aberrations upon focusing on a short distant object;

DESCRIPTION OF THE EMBODIMENTS

A preferred embodiment for carrying out the present invention is described hereunder.

Figure 17:
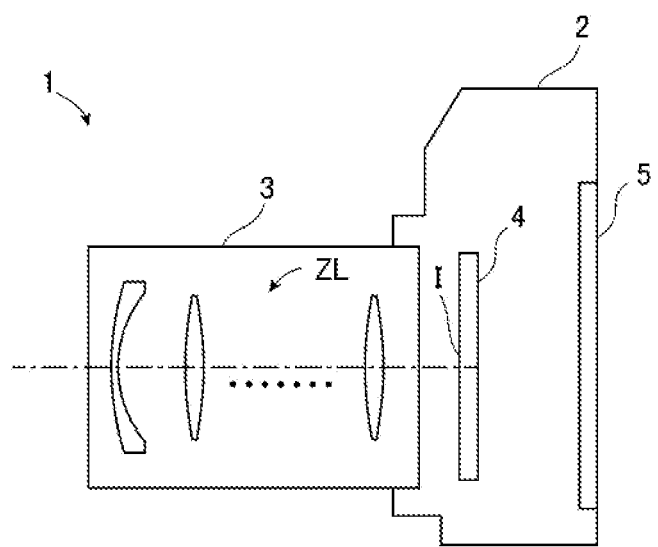
FIG. 17 is a diagram showing a configuration of a digital camera according to an embodiment of the optical apparatus.

FIG. 17 shows a schematic configuration of a digital camera according to an embodiment of an optical apparatus of the present invention. A digital camera 1 comprises a main body 2 and an imaging lens 3 that is attachable to and detachable from the main body 2. The main body 2 includes an imaging element 4, a main body control part (not shown) for controlling the operation of the digital camera, and a liquid crystal operation screen 5. The imaging lens 3 includes an optical system ZL consisting of a plurality of lens groups, and a lens position control mechanism (not shown) for controlling the position of each lens group. The lens position control mechanism includes a sensor for detecting the positions of the lens groups, a motor for moving the lens groups back and forth along an optical axis, a control circuit for driving the motor, and the like.

Light from a subject is focused on the optical system ZL of the imaging lens 3, and reaches an image surface I of the imaging element 4. The light from the subject that has reached the image surface I is photoelectrically converted by the imaging element 4, and recorded as digital image data in a memory that is not shown. The digital image data recorded in the memory is displayed on a liquid crystal screen 5 according to a user's operation. Hereinafter, the optical system ZL will be described in detail.

An optical system according to the embodiment of the present invention consists of a plurality of lens groups including a first focusing lens group and a second focusing lens group which are arranged along an optical axis, wherein the second focusing lens group is provided at a position closer to an image surface than the first focusing lens group, the first focusing lens group has positive refractive power and moves in a direction to an object along the optical axis upon focusing on from an infinity object to a short distant object, the second focusing lens group moves in a direction to the image surface along the optical axis upon focusing on from an infinity object to a short distant object, and the following conditional expression is satisfied:

$$-0.20<\beta F1/\beta F2<0.50 \qquad (1),$$

where $\beta F1$: a lateral magnification of the first focusing lens group upon focusing on the infinity object, and $\beta F2$: a lateral magnification of the second focusing lens group upon focusing on the infinity object.

The above conditional expression (1) defines the ratio between the lateral magnifications of the first focusing lens group and the second focusing lens group upon focusing on an infinity object. The optical system of the present embodiment achieves reduction in weight and miniaturization of the optical system by performing focusing with the two focusing lens groups, and the second focusing lens group plays a main role as a focusing group while the first focusing lens group plays a role as a focusing group and also plays a role of correcting aberrations caused by the movement of the second focusing lens group. By defining the balance of the two focusing lens groups so as to satisfy the conditional expression (1), various aberrations such as curvature of field can be excellently corrected, whereby aberration fluctuations that occur upon focusing from an infinity object onto a short distant object can be effectively suppressed.

Here, it is advantageous that the corresponding value of the conditional expression (1) has a large absolute value from only the viewpoint of suppressing the movement amount of the focusing lens groups. On the other hand, the optical system of the present embodiment ensures an improvement in the aberration correction function while suppressing the movement amount of the lens groups, and excellently corrects various aberrations by limiting the range of the corresponding value of the conditional expression (1) so that the corresponding value does not become too large. If the corresponding value of the conditional expression (1) deviates from a specified numerical range, it becomes difficult to excellently correct various aberrations, so that it is impossible to sufficiently obtain the effect of suppressing aberration fluctuations.

In order to ensure the effect of the present embodiment, it is preferable that an upper limit value 0.50 of the conditional expression (1) is set to a smaller value, for example, 0.45, 0.40, 0.35, 0.30, 0.25, 0.20, 0.18, 0.15, 0.13 or 0.10. Further, a lower limit value −0.20 is also set to a larger value, for example, −0.18, −0.15, −0.13 or −0.10, the effect of the present embodiment can be further ensured.

Further, it is preferable that in the above optical system, the following conditional expression (2) is satisfied:

$$-4.50<fF1/fF2<3.00 \qquad (2),$$

where fF1: a focal length of the first focusing lens group, and fF2: a focal length of the second focusing lens group.

The above conditional expression (2) defines the ratio between the focal length of the first focusing lens group and the focal length of the second focusing lens group. By satisfying the conditional expression (2), the power balance between the first focusing lens group and the second focusing lens group becomes a balance in which an aberration correction function is prioritized, and fluctuations in various aberrations such as curvature of field are effectively suppressed. If the corresponding value of the conditional expression (2) deviates from the specified numerical range, it becomes difficult to excellently correct various aberrations, so that it is impossible to sufficiently obtain the effect of suppressing aberration fluctuations.

In order to ensure the effect of the present embodiment, it is preferable that an upper limit value 3.00 of the conditional expression (2) is set to a smaller value, for example, 2.80, 2.65, 2.50, 2.45, 2.40, 2.35, 2.30, 2.25 or 2.00. A lower limit value −4.50 is also set to a larger value, for example, −4.40, −4.30, −4.20, −4.10, −4.05, −4.00, −3.95, −3.90 or −3.85, whereby the effect of the present embodiment can be further ensured.

When the second focusing lens group has positive refractive power, in order to ensure the effect of the present embodiment, it is preferable that the upper limit value 3.00 of the conditional expression (2) is set to a smaller value, for example, 2.80, 2.65, 2.50, 2.45, 2.40, 2.35, 2.30, 2.25 or 2.00. A lower limit value −4.50 is also set to a larger value, for example, −4.30, −4.00, −3.00, −2.00, −1.00, −0.50, 0.01, 0.05, 0.30, 0.50 or 0.80, whereby the effect of the present embodiment can be further ensured.

When the second focusing lens group has negative refractive power, in order to ensure the effect of the present embodiment, it is preferable that the upper limit value 3.00 of the conditional expression (2) is set to a smaller value, for example, 2.80, 2.50, 2.00, 1.50, 1.00, 0.50, 0.05, −0.05, −0.10, −0.50, −0.80, −1.00 or −1.20. The lower limit value −4.50 is also set to a larger value, for example, −4.40, −4.30, −4.20, −4.10, −4.05, −4.00, −3.95, −3.90 or −3.85, whereby the effect of the present embodiment can be further ensured.

Further, it is preferable that in the above optical system, the following conditional expression (3) is satisfied:

$$0.50<(-MVF1)/MVF2<7.00 \qquad (3),$$

where

MVF1: a movement amount of the first focusing lens group upon focusing from the infinity object onto the short distant object, and MVF2: a movement amount of the second focusing lens group upon focusing from the infinity object onto the short distant object, and where the movement amounts MVF1 and MVF2 represent movements in the direction to the image surface with positive values.

The conditional expression (3) defines the ratio between the movement amount of the first focusing lens group and the movement amount of the second focusing lens group upon focusing from an infinity object onto a short distant object. By satisfying the conditional expression (3), fluctuations in various aberrations such as curvature of field are effectively suppressed. If the corresponding value of the conditional expression (3) deviates from a specified numerical range, it becomes difficult to excellently correct various aberrations, so that it is impossible to sufficiently obtain the effect of suppressing aberration fluctuations.

In order to ensure the effect of the present embodiment, it is preferable that an upper limit value 7.00 of the conditional expression (3) is set to a smaller value, for example, 6.80, 6.00, 5.00, 4.50, 4.00, 3.50, 3.30, 3.00 or 2.85. A lower limit value 0.50 is also set to a larger value, for example, 0.60, 0.70, 0.80, 0.85, 0.90, 0.95, 1.00, 1.05 or 1.10, whereby the effect of the present embodiment can be further ensured.

Further, it is preferable that in the above optical system, the following conditional expression (4) is satisfied:

$$1.30 < fF1/f < 5.00 \qquad (4),$$

where
fF1: a focal length of the first focusing lens group, and
f: a focal length of the entire optical system.

The conditional expression (4) defines the ratio between the focal length of the first focusing lens group and the focal length of the entire optical system, and shows the power distribution of the first focusing lens group in the entire system. By satisfying the conditional expression (4), the function of suppressing aberration fluctuations works relatively strongly, various aberrations such as curvature of field can be excellently corrected, and the aberration fluctuations can be effectively suppressed. If the corresponding value of the conditional expression (4) deviates from a specified numerical range, it becomes difficult to excellently correct various aberrations, so that it is impossible to sufficiently obtain the effect of suppressing aberration fluctuations.

In order to ensure the effect of the present embodiment, it is preferable that an upper limit value 5.00 of the conditional expression (4) is set to a smaller value, for example, 4.90, 4.80, 4.70, 4.60, 4.50, 4.45, 4.40, 4.35 or 4.30. A lower limit value 1.30 is also set to a larger value, for example, 1.35, 1.40, 1.45, 1.50, 1.55, 1.60, 1.65, 1.70 or 1.73, whereby the effect of the present embodiment can be further ensured.

Further, it is preferable that in the above optical system, the following conditional expression (5) is satisfied:

$$-2.00 < fF2/f < -0.05, \text{ or } 0.05 < fF2/f < 3.00 \qquad (5),$$

where
fF2: a focal length of the second focusing lens group, and
f: a focal length of the entire optical system.

The conditional expression (5) defines the ratio between the focal length of the second focusing lens group and the focal length of the entire optical system, and shows the power distribution of the second focusing lens group in the entire system. When the focal length of the second focusing lens group satisfies the conditional expression (5), it is possible to reduce the movement amount of the second focusing lens group in focusing while excellently correcting the aberrations. If the corresponding value of the conditional expression (5) deviates from a specified numerical range, it becomes difficult to sufficiently suppress the aberration fluctuations while suppressing the movement amounts to miniaturize the optical system.

In order to ensure the effect of the present embodiment, it is preferable that an upper limit value 3.00 of the conditional expression (5) is set to a smaller value, for example, 2.95, 2.90, 2.85, 2.80, 2.75, 2.70, 2.65, 2.60, 2.55 or 2.53. A lower limit value −2.00 is also set to a larger value, for example, −1.90, −1.80, −1.70, −1.60, −1.55, −1.50, −1.45 or −1.40, whereby the effect of the present embodiment can be further ensured.

When the second focusing lens group has positive refractive power, in order to ensure the effect of the present embodiment, it is preferable that the upper limit value 3.00 of the conditional expression (5) is set to a smaller value, for example, 2.95, 2.90, 2.85, 2.80, 2.75, 2.70, 2.65, 2.60, 2.55 or 2.53. The lower limit value −2.00 is also set to a larger value, for example, −1.80, −1.50, −1.00, −0.50, −0.05, 0.05, 0.50, 0.80, 1.00, 1.20 or 1.40, whereby the effect of the present embodiment can be further ensured.

When the second focusing lens group has negative refractive power, in order to ensure the effect of the present embodiment, it is preferable that the upper limit value 3.00 of the conditional expression (5) is set to a smaller value, for example, 2.50, 2.00, 1.50, 1.00, 0.50, −0.05, −0.20, −0.50, −0.80, −1.00 or −1.10. The lower limit value −2.00 is also set to a larger value, for example, −1.90, −1.80, −1.70, −1.60, −1.55, −1.50, −1.45 or −1.40, whereby the effect of the present embodiment can be further ensured.

Further, it is preferable that in the above optical system, the following conditional expression (6) is satisfied:

$$-1.80 < \beta F1 < 0.60 \qquad (6),$$

where
$\beta F1$: the lateral magnification of the first focusing lens group upon focusing on the infinity object.

The conditional expression (6) defines the range of the lateral magnification of the first focusing lens group upon focusing on an infinity object. By satisfying the conditional expression (6), it is possible to suppress fluctuations in various aberrations such as spherical aberration upon focusing from an infinity object onto a short distant object.

If the corresponding value of the conditional expression (6) deviated from the specified range, the deflection angle of an epaxial ray of light increases, so that it becomes difficult to correct the spherical aberration. Further, when the symmetry for a principal ray of light is poor, it becomes difficult to correct distortion and coma aberration.

In order to ensure the effect of the present embodiment, it is preferable that an upper limit value 0.60 of the conditional expression (6) is set to a smaller value, for example, 0.55, 0.50, 0.45, 0.43, 0.40, 0.38, 0.35, 0.33, or further 0.31. A lower limit value −1.80 is also set to a larger value, for example, −1.50, −1.35, −1.00, −0.80, −0.50, −0.25, 0.01, 0.05, or further 0.10, whereby the effect of the present embodiment can be further ensured.

Further, it is preferable that in the above optical system, the following conditional expression (7) is satisfied:

$$-0.60 < 1/\beta F2 < 0.70 \qquad (7),$$

where
$\beta F2$: the lateral magnification of the second focusing lens group upon focusing on the infinity object.

The conditional expression (7) defines the range of the lateral magnification of the second focusing lens group upon focusing on an infinity object by a reciprocal. When the lateral magnification of the second focusing lens group satisfies the conditional expression (7), it is possible to suppress fluctuations in various aberrations such as spherical aberration upon focusing from an infinity object onto a short distant object.

If the corresponding value of the conditional expression (7) deviates from a specified range, the deflection angle of an epaxial ray of light increases, so that it becomes difficult to correct the spherical aberration. Further, when the symmetry for a principal ray of light is poor, it becomes difficult to correct distortion and coma aberration.

In order to ensure the effect of the present embodiment, it is preferable that an upper limit value 0.70 of the conditional expression (7) is set to a smaller value, for example, 0.65, 0.60, 0.55, 0.50, 0.48, 0.45, 0.43, 0.40, 0.38, or further 0.36. A lower limit value −0.60 is also set to a larger value, for example, −0.50, −0.40, −0.30, −0.25, −0.10, −0.01, 0.05, or further 0.10, whereby the effect of the present embodiment can be further ensured.

Further, it is preferable that in the above optical system, the following conditional expression (8) is satisfied:

$$\{\beta F1+(1/\beta F1)\}^{-2}<0.250 \quad (8),$$

where $\beta F1$: the lateral magnification of the first focusing lens group upon focusing on the infinity object.

The conditional expression (8) defines the range of the lateral magnification of the first focusing lens group upon focusing on an infinity object in a style different from that of the conditional expression (6). When the lateral magnification of the first focusing lens group satisfies the conditional expression (8), it is possible to suppress fluctuations in various aberrations such as spherical aberration upon focusing from an infinity object onto a short distant object.

If the corresponding value of the conditional expression (8) deviates from a specified range, the deflection angle of an epaxial ray of light increases, so that it becomes difficult to correct the spherical aberration. Further, when the symmetry for a principal ray of light is poor, it becomes difficult to correct distortion and coma aberration.

In order to ensure the effect of the present embodiment, it is preferable that an upper limit value 0.250 of the conditional expression (8) is set to a smaller value, for example, 0.248, 0.245, 0.243, 0.240, 0.238, 0.235, 0.220, 0.200, 0.180, 0.150, or further 0.100.

Further, it is preferable that in the above optical system, the following conditional expression (9) is satisfied:

$$\{\beta F2+(1/\beta F2)\}^{-2}<0.160 \quad (9),$$

where $\beta F2$: the lateral magnification of the second focusing lens group upon focusing on the infinity object.

The conditional expression (9) defines the range of the lateral magnification of the second focusing lens group upon focusing on an infinity object in a style different from that of the conditional expression (7). When the lateral magnification of the second focusing lens group satisfies the conditional expression (9), it is possible to suppress fluctuations in various aberrations such as spherical aberration upon focusing from an infinity object onto a short distant object.

If the corresponding value of the conditional expression (9) deviates from a specified range, the deflection angle of an epaxial ray of light increases, so that it becomes difficult to correct the spherical aberration. Further, when the symmetry for a principal ray of light is poor, it becomes difficult to correct distortion and coma aberration.

In order to ensure the effect of the present embodiment, it is preferable that an upper limit value 0.160 of the conditional expression (9) is set to a smaller value, for example, 0.150, 0.130, 0.115, 0.110, or further 0.100.

Further, it is preferable that the above optical system consists of a front lens group including the first focusing lens group, an intermediate lens group, the second focusing lens group, and a rear lens group having positive refractive power, which are arranged in this order closest to the object, wherein the first focusing lens group is arranged at a position closest to the image surface in the front lens group.

In the above configuration, incident light to or emitted light from the first focusing lens group becomes nearly collimated light, and various aberrations can be excellently corrected.

Further, it is preferable that the above optical system consists of a front lens group including the first focusing lens group, an intermediate lens group, the second focusing lens group, and a rear lens group having positive refractive power, which are arranged in this order closest to the object, wherein the intermediate lens group and the second focusing lens group have different signs in refractive power.

When both the intermediate lens group and the second focusing lens group have positive refractive power, it is difficult for the second focusing lens group to sufficiently suppress the aberration fluctuation as a focusing group. On the other hand, when both the intermediate lens group and the second focusing lens group have negative refractive power, this is not preferable because a ray of light that has passed through each lens group travels so as to diverge and thus the size of the rear lens group is large. When any one of the intermediate lens group and the second focusing lens group has positive refractive power and the other has negative refractive power, it is possible to excellently suppress the aberration fluctuation upon focusing from an infinity object onto a short distant object.

Further, it is preferable that the above optical system comprises an intermediate lens group to be arranged between the first focusing lens group and the second focusing lens group, wherein the following conditional expression (10) is satisfied:

$$-8.00<(-fM)/f<2.00 \quad (10),$$

where fM: a focal length of the intermediate lens group, and
f: a focal length of the entire optical system.

The intermediate lens group is a lens group to be arranged between the first focusing lens group and the second focusing lens group so as to be sandwiched by the two focusing lens groups. The conditional expression (10) defines the ratio between the focal length of the intermediate lens group and the focal length of the entire optical system, and shows the power distribution of the intermediate lens group in the entire system.

In the above optical system, a lens group having a large contribution to image formation is arranged to be closer to the image surface, and a lens group having a large contribution to aberration correction is arranged to be closer to the object. By arranging the intermediate lens group satisfying the conditional expression (10), the image formation of the optical system can be excellently performed, and various aberrations such as spherical aberration can be corrected in a well-balanced manner as a whole. If the corresponding value of the conditional expression (10) deviates from a specified numerical range, it becomes difficult to excellently correct various aberrations, so that it is impossible to sufficiently obtain the effect of suppressing aberration fluctuations.

In order to ensure the effect of the present embodiment, it is preferable that an upper limit value 2.00 of the conditional expression (10) is set to a smaller value, for example, 1.85, 1.70, 1.60, 1.50, 1.40, 1.30, 1.25, 1.20, 1.15 or 1.10. A lower limit value −8.00 is also set to a larger value, for example −7.00, −6.00, −5.00, −4.00, −3.00, −2.50 or −2.20, whereby the effect of the present embodiment can be further ensured.

When the second focusing lens group has positive refractive power, in order to ensure the effect of the present embodiment, it is preferable that the upper limit value 2.00 of the conditional expression (10) is set to a smaller value, for example, 1.85, 1.70, 1.60, 1.50, 1.40, 1.30, 1.25, 1.20, 1.15 or 1.10. The lower limit value −8.00 is also set to a larger value, for example, −6.00, −3.00, −1.00, −0.05, 0.05, 0.10, 0.30, 0.50, 0.70 or 0.80, whereby the effect of the present embodiment can be further ensured.

When the second focusing lens group has negative refractive power, in order to ensure the effect of the present embodiment, it is preferable that the upper limit value 2.00 of the conditional expression (10) is set to a smaller value, for example, 1.85, 1.70, 1.60, 1.50, 1.40, 1.30, 1.25, 1.20, 1.15 or 1.10. The lower limit value −8.00 is also set to a larger value, for example, −7.00, −6.00, −5.00, −4.00, −3.00, −2.50 or −2.20, whereby the effect of the present embodiment can be further ensured.

Further, it is preferable that the above optical system comprises a rear lens group which is arranged on the image surface side of the second focusing lens group and has positive refractive power, wherein the following conditional expression (11) is satisfied:

$$0.50 < fR/f < 3.50 \qquad (11),$$

where fR: a focal length of the rear lens group, and f: a focal length of the entire optical system.

The rear lens group also enhances image formation of the optical system and contributes to correction of aberrations. The conditional expression (11) defines the ratio between the focal length of the rear lens group and the focal length of the entire system, and shows the power distribution of the rear lens group in the entire system. By arranging the rear lens group satisfying the conditional expression (11), it is possible to enhance image formation and correct various aberrations such as spherical aberration in a well-balanced manner as a whole.

In order to ensure the effect of the present embodiment, it is preferable that an upper limit value 3.50 of the conditional expression (11) is set to a smaller value, for example, 3.35, 3.20, 3.00, 2.85, 2.70, 2.50, 2.40, 2.30, 2.20 or 2.10. A lower limit value 0.50 is also set to a larger value, for example, 0.65, 0.80, 0.90, 1.00, 1.05, 1.10, 1.15, 1.20, 1.25 or 1.28, whereby the effect of the present embodiment can be further ensured.

Further, it is preferable that the above optical system comprises a rear lens group which is arranged on the image surface side of the second focusing lens group and has positive refractive power, wherein the following conditional expression (12) is satisfied:

$$-2.00 < fF2/fR < 3.00 \qquad (12),$$

where fF2: a focal length of the second focusing lens group, and fR: a focal length of the rear lens group.

The conditional expression (12) defines the ratio between the focal lengths of the second focusing lens group and the rear lens group, and shows the power balance between the second focusing lens group and the rear lens group. The second focusing lens group and the rear lens group are balanced with each other so as to satisfy the conditional expression (12), whereby various aberrations such as spherical aberration can be corrected in a well-balanced manner as a whole.

In order to ensure the effect of the present embodiment, it is preferable that an upper limit value 3.00 of the conditional expression (12) is set to a smaller value, for example, 2.90, 2.80, 2.70, 2.60, 2.50, 2.40, 2.30, 2.20 or 2.10. A lower limit value −2.00 is set to a larger value, for example, −1.80, −1.70, −1.60, −1.50, −1.40, −1.30, −1.20 or −1.10, whereby the effect of the present embodiment can be further ensured.

When the second focusing lens group has positive refractive power, in order to ensure the effect of the present embodiment, it is preferable that the upper limit value 3.00 of the conditional expression (12) is set to a smaller value, for example, 2.90, 2.80, 2.70, 2.60, 2.50, 2.40, 2.30, 2.20 or 2.10. A lower limit value −2.00 is also set to a larger value, for example, −1.50, −1.00, −0.50, −0.05, 0.05, 0.10, 0.30, 0.50, 0.60 or 0.70, whereby the effect of the present embodiment can be further ensured.

When the second focusing lens group has negative refractive power, in order to ensure the effect of the present embodiment, it is preferable that the upper limit value 3.00 of the conditional expression (12) is set to a smaller value, for example, 2.90, 2.80, 2.70, 2.60, 2.50, 2.40, 2.30, 2.20 or 2.10. A lower limit value −2.00 is also set to a larger value, for example, −1.80, −1.70, −1.60, −1.50, −1.40, −1.30, −1.20 or −1.10, whereby the effect of the present embodiment can be further ensured.

Further, it is preferable that in the above optical system, a lens arranged at a position closest to the object is a negative meniscus lens.

By arranging a lens having negative refractive power at the position closest to the object, spherical aberration and curvature of field can be excellently corrected, and by using a negative meniscus lens for the lens, the deflection angle of a ray of light can be made gentle even when the lens has a wide angle of view or a large aperture, and a bright image with appropriate resolution can be obtained.

Further, it is preferable that the above optical system comprises an intermediate lens group to be arranged between the first focusing lens group and the second focusing lens group, wherein the intermediate lens group is configured so that at least one air lens having positive refractive power is formed, and the following conditional expression (13) is satisfied:

$$0.10 < -(r2Lm+r1Lm)/(r2Lm-r1Lm) < 1.20 \qquad (13),$$

where r1Lm: a radius of curvature of a surface on an object side of an air lens closest to the image surface among air lenses formed in the intermediate lens group, and r2Lm: a radius of curvature of a surface on an image surface side of an air lens closest to the image surface among the air lenses formed in the intermediate lens group.

The conditional expression (13) defines the shape factor of the air lens formed in the intermediate lens group. By arranging the lenses constituting the intermediate lens group so that an air lens having a shape satisfying the conditional expression (13) is formed, various aberrations such as spherical aberration can be excellently corrected.

In order to ensure the effect of the present embodiment, it is preferable that an upper limit value 1.20 of the conditional expression (13) is set to a smaller value, for example, 1.15, 1.10, 1.08, 1.05, 1.03 or 1.00. A lower limit value 0.10 is also set to a larger value, for example, 0.12, 0.14, 0.15, 0.16, 0.17 or 0.18, whereby the effect of the present embodiment can be further ensured.

Further, it is preferable that the above optical system comprises an intermediate lens group to be arranged between the first focusing lens group and the second focusing lens group, and the intermediate lens group has an aperture stop.

The configuration in which the aperture stop is arranged inside the intermediate lens group, that is, near the center of the optical system can minimize flux of light which is away from the optical axis and passes through the edge of the lens, which is advantageous in terms of aberration correction. Since the optical system can be configured to have a shape close to a symmetrical shape, there is also an advantage that coma aberration can be easily suppressed. Further, the aperture stop is arranged near the focusing lens group that moves upon focusing, so that the movement amount of the focusing lens group with respect to the aperture stop relatively decreases, which is advantageous in terms of suppressing the fluctuations of aberrations. Furthermore, when the aperture stop is located apart from the focusing lens group, it is necessary to increase the size of the lens, but the configuration in which the aperture stop is arranged between the first focusing lens group and the second focusing lens group enables the optical system to be configured with relatively small lenses, so that the optical apparatus can be miniaturized.

Further, it is preferable that the above optical system comprises a leading lens group arranged on the object side of the first focusing lens group, and the leading lens group includes a negative meniscus lens, a negative lens, a positive lens, and a positive lens, which are arranged in this order closest to the object. Specifically, it is preferable that the optical system includes a leading lens group, a first focusing lens group, an intermediate lens group, a second focusing lens group, and a rear lens group having positive refractive power in this order closest to the object, and the leading lens group has the above configuration.

By configuring the leading lens group serving as a correction group as described above, longitudinal chromatic aberration and chromatic aberration of magnification can be effectively corrected.

Further, it is preferable that the above optical system comprises a leading lens group arranged on the object side of the first focusing lens group, wherein the leading lens group includes a negative meniscus lens and a negative lens arranged in this order closest to the object, an air lens is formed between the negative meniscus lens and the negative lens, and the following conditional expression is satisfied:

$$0<(r2Lp+r1Lp)/(r2Lp-r1Lp)<1.20 \quad (14),$$

where r1Lp: a radius of curvature of a surface on the object side of the air lens formed in the leading lens group, and r2Lp: a radius of curvature of a surface on the image surface side of the air lens formed in the leading lens group.

Specifically, it is preferable that the optical system comprises a leading lens group, a first focusing lens group, an intermediate lens group, a second focusing lens group, and a rear lens group having positive refractive power in this order closest to the object, and the leading lens group has the above configuration.

The conditional expression (14) defines the shape factor of the air lens formed in the leading lens group. The lenses constituting the leading lens group are arranged so as to form an air lens having a shape satisfying the conditional expression (14), whereby it is possible to excellently correct various aberrations such as coma aberration and spherical aberration.

In order to ensure the effect of the present embodiment, it is preferable that an upper limit value 1.20 of the conditional expression (14) is set to a smaller value, for example, 1.10, 1.00, 0.90, 0.80, 0.70, 0.65, 0.60 or 0.55. A lower limit value 0 is also set to a larger value, for example, 0.03, 0.05, 0.08 or 0.10, whereby the effect of the present embodiment can be further ensured.

Further, it is preferable that in the above optical system, the first focusing lens group and the second focusing lens group comprise at least one negative lens. Chromatic aberration can be effectively corrected by providing a negative lens in the focusing lens group having positive refractive power.

Further, it is preferable that the above optical system comprises an intermediate lens group arranged between the first focusing lens group and the second focusing lens group, and the intermediate lens group includes at least one positive meniscus lens. The function of the positive meniscus lens can effectively correct chromatic aberration and coma aberration.

Further, it is preferable that the above optical system consists of a leading lens group, a first focusing lens group, an intermediate lens group, a second focusing lens group, and a rear lens group having positive refractive power, which are arranged in this order closest to the object, and at least one of the leading lens group, the intermediate lens group, and the rear lens group comprises a pair of negative lenses being adjacent with each other.

In a configuration in which the pair of negative lenses are provided, the effect of suppressing coma aberration can be particularly expected. A configuration in which an adjacent negative lens is provided to the intermediate lens group and a configuration in which an adjacent negative lens is provided to the rear lens group can be expected to have an effect of suppressing spherical aberration and coma aberration.

Further, it is preferable that in the above optical system, the following conditional expression (15) is satisfied:

$$1.00<NAm/NAi<1.50 \quad (15),$$

where

NAi: a numerical aperture on the image side upon focusing on the infinity object, and NAm: a numerical aperture on the image side upon focusing on the short distant object.

The conditional expression (15) defines the ratio between the numerical aperture on the image side upon focusing on an infinity object and the numerical aperture on the image side upon focusing on a short distant object. By satisfying the conditional expression (15), it becomes easy to focus light from a subject at a short distance, and a bright image with an appropriate resolution can be obtained by a short-distance shooting.

In order to ensure the effect of the present embodiment, it is preferable that an upper limit value 1.20 of the conditional expression (15) is set to a smaller value, for example, 1.19, 1.18, 1.17 or 1.15. A lower limit value 0.10 is also set to a larger value, for example, 0.30, 0.50, 0.70, 0.80, 0.90 or 1.00, whereby the effect of the present embodiment can be further ensured.

Further, it is preferable that in the above optical system, a lens arranged at a position closest to the object among lenses constituting the first focusing lens group is a negative lens, and the following conditional expression (16) is satisfied:

$$1.50<(r2L1+r1L1)/(r2L1-r1L1)<3.50 \quad (16),$$

where r1L1: a radius of curvature of a surface on the object side of the negative lens, and r2L1: a radius of curvature of a surface on the image surface side of the negative lens.

The conditional expression (16) defines the shape factor of the above negative lens. A negative lens having a shape satisfying the conditional expression (16) is provided in the first focusing lens group having positive refractive power, whereby various aberrations such as chromatic aberration can be excellently corrected.

In order to ensure the effect of the present embodiment, it is preferable that an upper limit value 3.50 of the conditional expression (16) is set to a smaller value, for example, 3.30, 3.15, 3.00, 2.90, 2.80, 2.70 or 2.60. A lower limit value −2.00 is also set to a larger value such as −1.50, −1.00, −0.50, −0.10, 0.10, 0.50, 1.00, 1.30, 1.50, 1.80, 2.00 or 2.10, whereby the effect of the present embodiment can be further ensured.

Further, it is preferable that the above optical system comprises a rear lens group which is arranged on the image surface side of the second focusing lens group and has positive refractive power, wherein the rear lens group is configured to form an air lens, and the following conditional expression (17) is satisfied:

$$0.00<(r2Lr+r1Lr)/(r2Lr-r1Lr)<1.20 \quad (17),$$

where r1Lr: a radius of curvature of a surface on the object side of the air lens formed in the rear lens group, and r2Lr: a radius of curvature of a surface on the image surface side of the air lens formed in the rear lens group.

The conditional expression (17) defines the shape factor of the air lens formed in the rear lens group. The lenses constituting the rear lens group are arranged so as to form an air lens having a shape satisfying the conditional equation (17), whereby various aberrations such as spherical aberration and coma aberration can be excellently corrected.

In order to ensure the effect of the present embodiment, it is preferable that an upper limit value 1.20 of the conditional expression (17) is set to a smaller value, for example, 1.15, 1.10, 1.08, 1.05, 1.03, 1.00 or 0.95. A lower limit value 0.00 is also set to a larger value, for example, 0.03, 0.05, 0.08, 0.10, 0.11 or 0.12, whereby the effect of the present embodiment can be further ensured.

Further, by adopting the above-mentioned configuration, the following conditional expression (18) can be satisfied while the above optical system excellently suppresses aberration fluctuations upon focusing:

$$25.00°<2\omega<75.00° \quad (18),$$

where $2\omega$: a total angle of view of the optical system.

In the above configuration, by narrowing the range of the corresponding values of each conditional expression, a lower limit value of the conditional expression (18) can also be set to a larger value, for example, 30.00°, 35.00°, 40.00°, 43.00°, 48.00°, 55.00°, 60.00°. Further, an upper limit value of the conditional expression (18) can also be set to a smaller value, for example, 73.00°, 70.00°, 68.00°, 66.50°.

Further, it is preferable that in the above optical system, the following conditional expression (19) is satisfied:

$$0.10<BFa/f<0.75 \quad (19),$$

where

BFa: a back focus (air equivalent length) of the optical system, and f: a focal length of the entire optical system.

The conditional expression (19) defines the ratio between the back focus of the optical system and the focal length of the entire system. By satisfying this conditional expression (19), various aberrations such as coma aberration can be effectively corrected.

When the corresponding value of the conditional expression (19) exceeds an upper limit value 0.75, the back focus increases with respect to the focal length, and it becomes difficult to correct various aberrations such as coma aberration. In order to ensure the effect of the present embodiment, it is preferable that the upper limit value 0.75 of the conditional expression (19) is set to a smaller value, for example, 0.73, 0.70, 0.65, 0.60, 0.55, 0.50, 0.48 or 0.45.

On the other hand, when the corresponding value of the conditional expression (19) is less than the lower limit value 0.10, the back focus decreases with respect to the focal length, and it becomes difficult to correct various aberrations such as coma aberration. In order to ensure the effect of the present embodiment, it is preferable that the lower limit value of the conditional expression (19) is set to a larger value, for example, 0.15, 0.20, 0.25 or 0.28.

Figure 18:
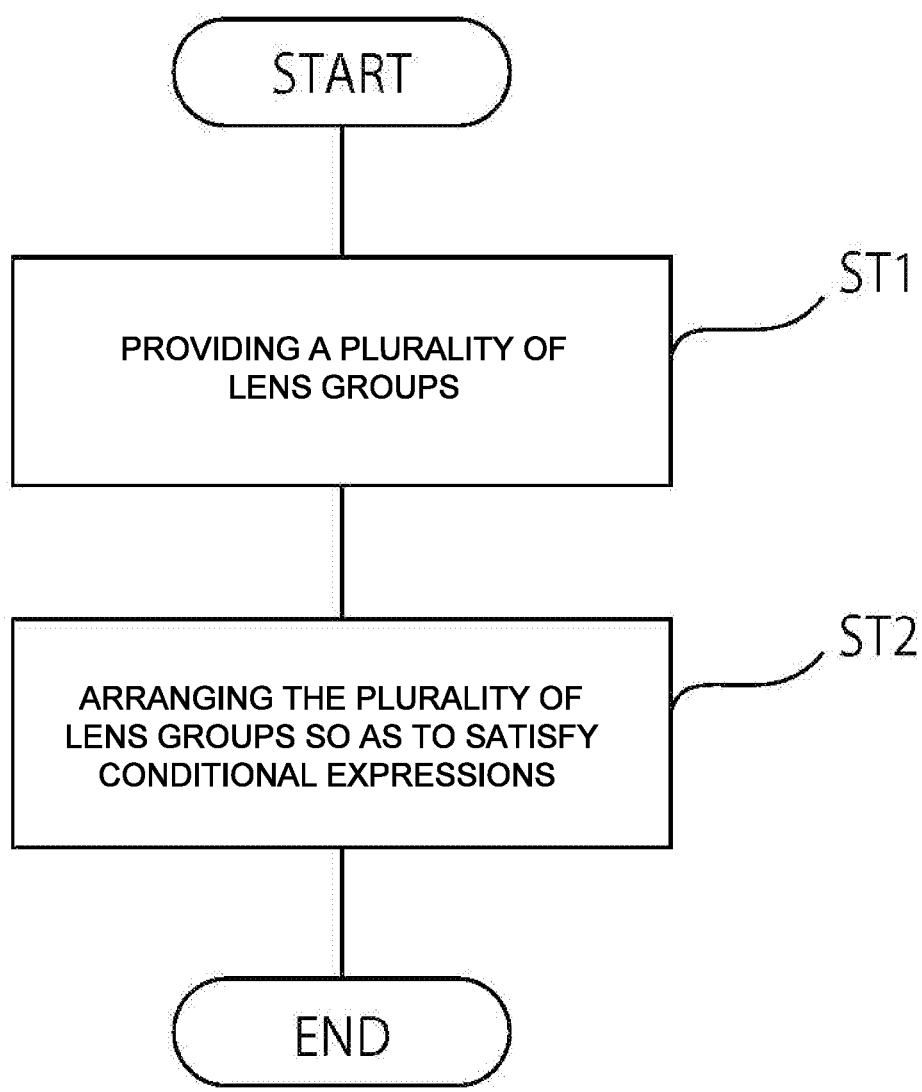
FIG. 18 is a flowchart showing a method for manufacturing an optical system.

Subsequently, a method for manufacturing the above-described optical system will be outlined with reference to FIG. 18. A method for manufacturing an optical system comprises configuring each of a plurality of lens groups including a first focusing lens group and a second focusing lens group (ST1), and arranging the configured lens groups in a lens barrel under the following condition (ST2): the first focusing lens group and the second focusing lens group are arranged along an optical axis; the second focusing lens group is provided at a position closer to an image surface than the first focusing lens group; the first focusing lens group has positive refractive power and moves in a direction to an object along the optical axis upon focusing on from an infinity object to a short distant object; the second focusing lens group moves in a direction to an image surface along the optical axis upon focusing on from an infinity object to a short distant object; and the first focusing lens group and the second focusing lens group satisfy the above-described conditional expression (1).

The optical system manufactured by the above procedure and an optical apparatus in which the above-described optical system is installed can achieve high-speed and quiet autofocus without increasing the size of the lens barrel, and can also excellently suppress aberration fluctuations upon focusing from an infinity object onto a short distant object.

EXAMPLES

Hereinafter, the above optical system will be further described with reference to eight numerical examples of Example 1 to Example 8. First, how to read the figures and tables referred to in the description of each example will be described.

FIG. 1, FIG. 3, FIG. 5, FIG. 7, FIG. 9, FIG. 11, FIG. 13, and FIG. 15 show the arrangement of the lens groups of the optical system in each example by a cross-sectional view. In the upper part of each figure, the movement locus (movement direction and amount of movement) of the focusing lens groups upon focusing from an infinity object onto a short distant object is shown by arrows with characters "focus" and "cc".

In FIG. 1, FIG. 3, FIG. 5, FIG. 7, FIG. 9, FIG. 11, FIG. 13, and FIG. 15, each lens group is represented by a combination of reference character G and a numeral, and each lens is represented by a combination of reference character L and a numeral. In this specification, in order to prevent complication due to an increase in the number of reference signs, numbering is performed for each example. Therefore, the combination of the same reference signs and numeral may be used for a plurality of examples, but this does not mean that the configurations indicated by the combination of the same reference signs and numeral are the same.

FIGS. 2A and 2B, FIGS. 4A and 4B, FIGS. 6A and 6B, FIGS. 8A and 8B, FIGS. 10A and 10B, FIGS. 12A and 12B, FIGS. 14A and 14B, and FIGS. 16A and 16B are diagrams showing various aberrations in the optical system of the respective examples, where FIG. 2A to FIG. 16A show various aberrations upon focusing on an infinity object, and FIG. 2B to FIG. 16B show various aberrations upon focusing on a short distant object. In these figures, FNO represents F number, NA represents numerical aperture, and Y represents image height. The value of the F number or numerical aperture corresponding to a maximum aperture is shown in a spherical aberration diagram, the maximum value of image height is shown in an astigmatism diagram and a distortion diagram, and the value of each image height is shown in a lateral aberration diagram. Further, d represents d-line (λ=587.6 nm), and g represents g-line (λ=435.8 nm). In the astigmatism diagram, a solid line shows a sagittal image surface, and a broken line shows a meridional image surface. The distortion diagram shows the distortion aberration based on the d-line, and the diagram of chromatic aberration of magnification shows the chromatic aberration of magnification based on the g-line.

Subsequently, tables used for describing each example will be described. In tables of [General Data], f represents the focal length of the entire lens system, FNO represents F number, 2ω represents the angle of view (unit is ° (degree), and w represents the half angle of view), and Y represents the maximum image height. TL represents the distance obtained by adding BF to the distance from a lens frontmost surface to a lens final surface on the optical axis upon focusing on an infinity object, BF represents the back focus from the lens final surface to the image surface I on the optical axis upon focusing on an infinity object, and BFa represents the air equivalent distance of BF.

In tables of [Lens Data], the surface number represents the order of the optical surface from the object side along the traveling direction of the ray of light, R represents the radius of curvature of each optical surface (represented by a positive value for a surface whose center of curvature is located on the image surface side), D represents the surface distance which is a distance on the optical axis from each optical surface to the next optical surface (or image surface), nd represents the refractive index of the material of the optical member with respect to d-line, and νd represents the Abbe number of the material of the optical member with respect to d-line. S represents an aperture stop, and "∞" of the radius of curvature represents a flat surface or an aperture. The description of the refractive index nd of air=1.00000 is omitted. When the lens surface is aspherical, the surface number is marked with * to indicate the paraxial radius of curvature in the column of the radius of curvature R.

In tables of [Aspherical Surface Data], for the aspherical surface shown in the [Lens Data], the shape of the aspherical surface is represented by the following expression (A). X(y) represents the distance (sag amount) along the optical axis direction from a tangent plane at the apex of the aspherical surface to a position on the aspherical surface at the height y, R represents the radius of curvature of a reference spherical surface (paraxial radius of curvature), κ represents a conic constant, and Ai represents an i-th order aspherical coefficient. "E-n" represents "x10-n". For example, 1.234E-05=1.234×10-5. A second-order aspherical coefficient A2 is equal to 0, and the description thereof is omitted.

$$X(y)=(y2/R)/\{1+(1-\kappa \times y2/R2)^{1/2}\}+A4 \times y4+A6 \times y6+A8 \times y8+A10 \times y10+A12 \times y12 \quad (A)$$

[Lens Group Data] tables show a first surface (a surface closest to the object), a focal length, a magnification upon focusing on infinity, and a magnification upon focusing on a short distant object for each lens group.

[Variable Distance Data] tables show a surface distance at a surface number at which the surface distance is indicated as "variable" in the table of [Lens Data]. The left column indicates the focal length and the surface distance upon focusing on an infinity object, and the right column indicates the lateral magnification and the surface distance upon focusing on a short distant object.

[Air Lens Data] tables show the radius of curvature and the value of the shape factor of each lens constituent surface for the air lens formed in each of the intermediate lens group and the leading lens group.

[Conditional Expression Corresponding value] tables show values corresponding to the respective conditional expressions.

Since "mm" is generally used as units of the focal length f, the radius of curvature R, the surface distance D, and other lengths, the unit of length is set to "mm" in each table of the present specification. However, the unit of length is not necessarily limited to "mm" because equivalent optical performance can be obtained even if the optical system is proportionally enlarged or contracted.

The descriptions of the figures and tables so far are common to all the examples, and the duplicated descriptions are omitted below.

Example 1

Example 1 will be described with reference to FIG. 1, FIGS. 2A and 2B, and Table 1.

FIG. 1 is a diagram showing a lens configuration of an optical system according to Example 1. A variable power optical system ZL(1) according to the Example 1 comprises a first lens group G1 (leading lens group) having negative refractive power, a second lens group G2 (first focusing lens group) having positive refractive power, a third lens group G3 (intermediate lens group) having negative refractive power, an aperture stop S arranged in the third lens group G3, a fourth lens group G4 (second focusing lens group) having positive refractive power, and a fifth lens group G5 (rear lens group) having positive refractive power, which are arranged in order from the object side.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing an object, a biconcave negative lens L12, a positive meniscus lens L13 having a concave surface facing the object, and a biconvex positive lens L14, which are arranged in order from the object side.

The second lens group G2 comprises a positive meniscus lens L21 having a convex surface facing the object.

The third lens group G3 comprises a positive meniscus lens L31 having a concave surface facing the object, a biconcave negative lens L32, an aperture stop S, a negative meniscus lens L33 having a concave surface facing the object, and a negative meniscus lens L34 having a convex surface facing the object, which are arranged in order from the object side. The negative meniscus lens L34 has an aspherical surface on the image surface side.

The fourth lens group G4 comprises a cemented positive lens including a biconvex positive lens L41 and a negative meniscus lens L42 having a concave surface facing the object, which are arranged in order from the object side. The negative meniscus lens L42 has an aspherical surface on the image surface side.

The fifth lens group G5 comprises a biconvex positive lens L51, a positive meniscus lens L52 having a convex surface facing the object, a cemented negative lens including a biconvex positive lens L53 and a biconcave negative lens L54, a cemented positive lens including a negative meniscus lens L55 having a convex surface facing the object and a positive meniscus lens L56 having a convex surface facing the object, and a parallel flat plate PP, which are arranged in order from the object side. The positive lens L53 has an aspherical surface on the object side. The negative meniscus lens L55 has an aspherical surface on the object side.

Table 1 shows values of various data on the optical system according to the Example 1.

TABLE 1

[General Data]

f = 34.000
FNo = 1.24
ω = 31.8°
Y = 21.7
TL = 150.038
BF = 15.474
BFa (Air equivalent length) = 14.929
NAi = 0.3740
NAm = 0.4176

[Lens Data]

| Surface Number | R | D | nd | vd |
|---|---|---|---|---|
| Object Surface | ∞ | | | |
| 1 | 78.45289 | 1.800 | 1.65844 | 50.8 |
| 2 | 31.79555 | 9.212 | | |
| 3 | −100.24254 | 1.800 | 1.80809 | 22.7 |
| 4 | 77.08680 | 2.664 | | |
| 5 | −1470.34330 | 4.336 | 1.95375 | 32.3 |
| 6 | −68.61232 | 0.200 | | |
| 7 | 278.33482 | 2.538 | 1.95375 | 32.3 |
| 8 | −284.02217 | Variable (D8) | | |
| 9 | 72.82254 | 3.228 | 1.95375 | 32.3 |
| 10 | 232.63870 | Variable (D10) | | |
| 11 | −201.17190 | 3.881 | 1.94594 | 18.0 |
| 12 | −58.84216 | 0.200 | | |
| 13 | −79.55028 | 1.800 | 1.65412 | 39.7 |
| 14 | 65.13432 | 4.225 | | |
| 15 | S | 5.772 | | |
| 16 | −43.92965 | 1.800 | 1.85026 | 32.4 |
| 17 | 696.99339 | 0.200 | | |
| 18 | 138.39305 | 1.800 | 1.49710 | 81.5 |
| 19* | 136.03491 | Variable (D19) | | |
| 20 | 89.83290 | 12.000 | 1.75500 | 52.3 |
| 21 | −53.66816 | 1.800 | 1.80301 | 25.5 |
| 22* | −69.76741 | Variable (D22) | | |
| 23 | 41.08076 | 12.000 | 1.43385 | 95.2 |
| 24 | −1829.48160 | 0.200 | | |
| 25 | 35.60849 | 12.000 | 1.43385 | 95.2 |
| 26 | 335.75250 | 3.116 | | |
| 27* | 69.11358 | 8.917 | 1.74310 | 49.4 |
| 28 | −51.12506 | 1.800 | 1.75520 | 27.6 |
| 29 | 35.57211 | 2.646 | | |
| 30* | 47.43881 | 4.336 | 1.76544 | 46.8 |
| 31 | 21.88490 | 12.000 | 1.59270 | 35.3 |
| 32 | 86.38261 | 12.874 | | |
| 33 | 0 | 1.600 | 1.51680 | 64.1 |
| 34 | 0 | (D34) | | |
| Image Surface | ∞ | | | |

[Aspherical Surface Data]

19th Surface
K = 1.0000
A4 = −4.21544E−06, A6 = 3.77109E−09, A8 = −1.73426E−12, A10 = 1.76549E−16

22nd Surface
K = 1.0000
A4 = 1.55287E−06, A6 = −1.51154E−10, A8 = −6.16779E−14, A10 = 1.65432E−16

27th Surface
K = 1.0000
A4 = −2.88315E−06, A6 = −6.70603E−09, A8 = −1.14021E−12, A10 = 5.52111E−15

30th Surface
K = 1.0000
A4 = −1.09981E−05, A6 = 2.21376E−10, A8 = −1.96393E−11, A10 = 7.87337E−15

[Lens Group Data]

| Group | First surface | Focal length | Magnification (Infinity) | Magnification (Short-distance) |
|---|---|---|---|---|
| 1 | 1 | −144.52 | 0 | 0.52462 |
| 2 | 9 | 110.06 | −1.29515 | −40.50152 |
| 3 | 11 | −34.37 | −0.16996 | −0.00762 |
| 4 | 20 | 54.58 | 13.12918 | 13.23197 |
| 5 | 23 | 49.64 | −0.08140 | −0.08140 |

[Variable Distance Data]

| | Infinity f = 34.000 | Short-distance β = −0.1744 |
|---|---|---|
| D0 | ∞ | 149.970 |
| D8 | 7.443 | 1.000 |
| D10 | 3.240 | 9.683 |
| D19 | 1.000 | 6.611 |
| D22 | 6.611 | 1.000 |
| D34 | 1.000 | 1.000 |

[Air Lens Data]

Air Convex Lens in the Intermediate Lens Group
R1=65.13432 (14th Surface), R2=−43.92965 (16th Surface), Shape Factor=−0.194424153
Air Convex Lens in the Leading Lens Group
R1=31.79555 (2nd Surface), R2=−100.24254 (3rd Surface), Shape Factor=0.518388217

FIGS. 2A and 2B show various aberration values of the optical system according to the Example 1 upon focusing on an infinity object and upon focusing on a short distant object, respectively. From the respective aberration diagrams, it can be seen that the optical system according to the Example 1 excellently corrects various aberrations and has excellent image formation performance.

Example 2

Example 2 will be described with reference to FIG. 3 FIGS. 4A and 4B, and Table 2.

Figure 3:
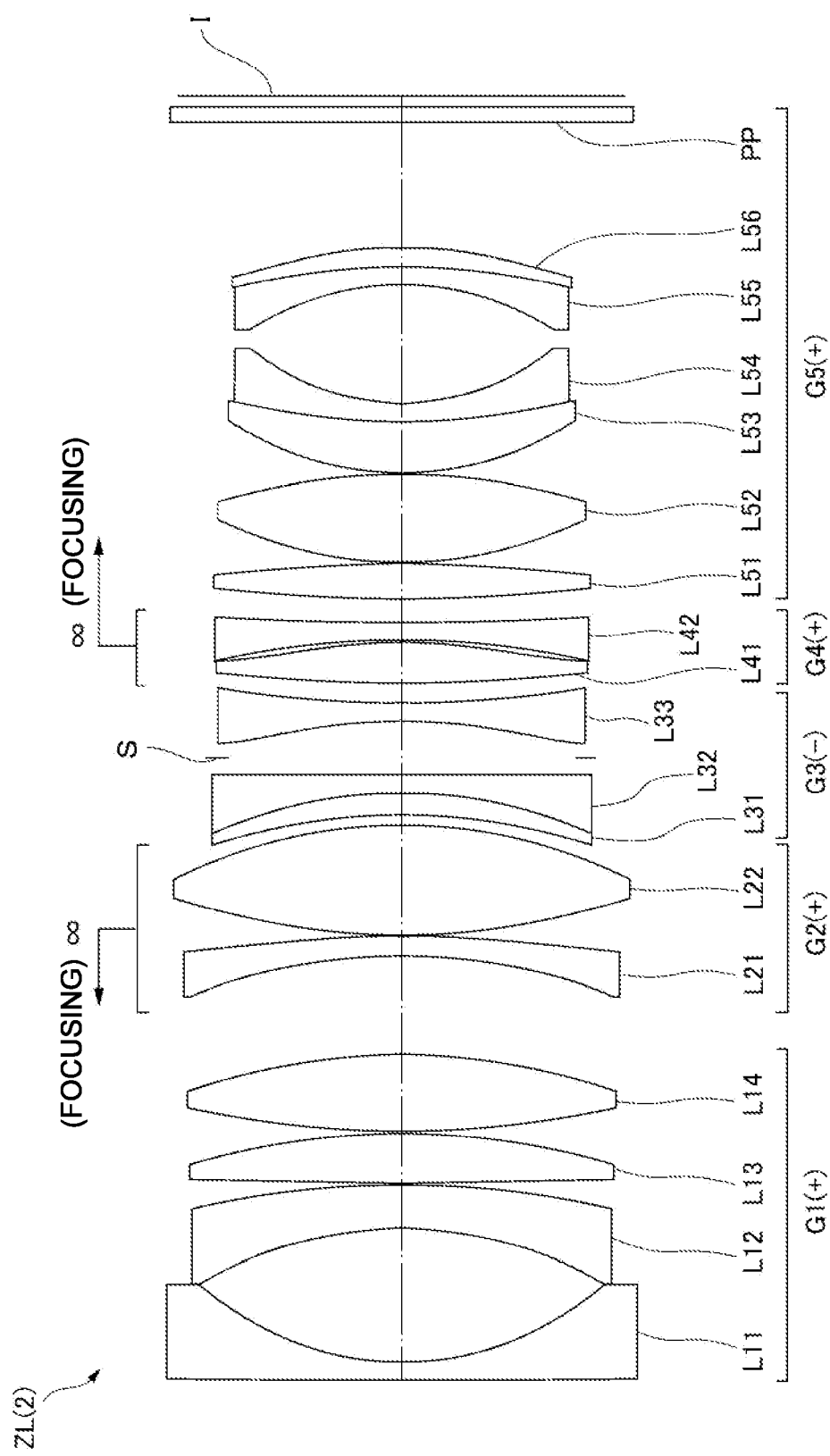
FIG. 3 is a diagram showing a lens configuration of an optical system according to Example 2.

FIG. 3 is a diagram showing a lens configuration of an optical system according to Example 2. A variable power optical system ZL (2) according to the Example 2 comprises a first lens group G1 (leading lens group) having positive refractive power, a second lens group G2 (first focusing lens group) having positive refractive power, a third lens group G3 (intermediate lens group) having negative refractive power, an aperture stop S arranged in the third lens group G3, a fourth lens group G4 (second focusing lens group) having positive refractive power, and a fifth lens group G5 (rear lens group) having positive refractive power, which are arranged in order from the object side.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing the object, a negative meniscus lens L12 having a concave surface facing the object, a biconvex positive lens L13, and a biconvex positive lens L14, which are arranged in order from the object side.

The second lens group G2 comprises a negative meniscus lens L21 having a concave surface facing the object, and a biconvex positive lens L22, which are arranged in order from the object side. The negative meniscus lens L21 has an aspherical surface on the image surface side.

The third lens group G3 comprises a cemented negative lens including a positive meniscus lens L31 having a concave surface facing the object and a biconcave negative lens L32, an aperture stop S, and a biconcave negative lens L33, which are arranged in order from the object side. The negative lens L33 has an aspherical surface on the object side.

The fourth lens group G4 comprises a biconvex positive lens L41, and a biconcave negative lens L42, which are arranged in order from the object side. The positive lens L41 has an aspherical surface on the image surface side.

The fifth lens group G5 comprises a biconvex positive lens L51, a biconvex positive lens L52, a cemented negative lens including a positive meniscus lens L53 having a convex surface facing the object and a negative meniscus lens L54 having a convex surface facing the object, a cemented negative lens including a negative meniscus lens L55 having a concave surface facing the object and a positive meniscus lens L56 having a concave surface facing the object, and a parallel flat plate PP, which are arranged in order from the object side. The positive meniscus lens L56 has an aspherical surface on the image surface side.

Table 2 shows values of various data on the optical system according to the Example 2.

TABLE 2

[General Data]

f = 34.000
FNo = 1.43
ω = 32.3°
Y = 21.7
TL = 125.037
BF = 14.695
BFa (Air equivalent length) = 14.150
NAi = 0.3301
NAm = 0.3484

TABLE 2-continued

[Lens Data]

| Surface Number | R | D | nd | vd |
|---|---|---|---|---|
| Object Surface | ∞ | | | |
| 1 | 1000 | 1.800 | 1.59319 | 67.9 |
| 2 | 29.24499 | 13.130 | | |
| 3 | −37.28850 | 4.069 | 1.51823 | 58.8 |
| 4 | −93.86687 | 0.200 | | |
| 5 | 642.57258 | 4.931 | 1.59319 | 67.9 |
| 6 | −69.30966 | 0.200 | | |
| 7 | 95.77502 | 7.486 | 1.59319 | 67.9 |
| 8 | −59.97313 | Variable (D8) | | |
| 9 | −54.97475 | 1.800 | 1.80301 | 25.5 |
| 10* | −104.11669 | 0.200 | | |
| 11 | 69.48619 | 10.763 | 1.59349 | 67.0 |
| 12 | −48.30276 | Variable (D12) | | |
| 13 | −57.29363 | 2.075 | 1.94594 | 18.0 |
| 14 | −44.38968 | 1.800 | 1.73800 | 32.3 |
| 15 | 9491.38110 | 1.515 | | |
| 16 | S | 3.617 | | |
| 17* | −44.64528 | 1.800 | 1.69343 | 53.3 |
| 18 | 122.92211 | Variable (D18) | | |
| 19 | 165.32448 | 3.998 | 1.85108 | 40.1 |
| 20* | −53.29124 | 0.200 | | |
| 21 | −82.65344 | 1.800 | 1.61266 | 44.5 |
| 22 | 323.52744 | Variable (D22) | | |
| 23 | 167.52953 | 3.404 | 1.88300 | 40.7 |
| 24 | −143.67029 | 0.200 | | |
| 25 | 39.56339 | 8.526 | 1.49782 | 82.6 |
| 26 | −60.08036 | 0.200 | | |
| 27 | 29.78264 | 4.998 | 1.49782 | 82.6 |
| 28 | 65.45522 | 1.800 | 1.75520 | 27.6 |
| 29 | 22.67864 | 11.518 | | |
| 30 | −26.84232 | 1.800 | 1.84666 | 23.8 |
| 31 | −63.50151 | 1.857 | 1.85108 | 40.1 |
| 32* | −36.52497 | 12.095 | | |
| 33 | 0 | 1.600 | 1.51680 | 64.1 |
| 34 | 0 | (D34) | | |
| Image Surface | ∞ | | | |

[Aspherical Surface Data]

10th Surface
K = 1.0000
A4 = 2.49384E−06, A6 = 2.22548E−09, A8 = −1.51167E−12, A10 = 2.82373E−15

17th Surface
K = 1.0000
A4 = 1.44522E−05, A6 = 2.01672E−09, A8 = −8.69052E−12, A10 = 1.73809E−14

20th Surface
K = 1.0000
A4 = 1.03005E−05, A6 = 4.33301E−09, A8 = −4.92005E−12, A10 = 2.23459E−14

32nd Surface
K = 1.0000
A4 = 8.30658E−06, A6 = 7.24869E−09, A8 = 3.50531E−11, A10 = 6.92136E−14

[Lens Group Data]

| Group | First surface | Focal length | Magnification (Infinity) | Magnification (Short-distance) |
|---|---|---|---|---|
| 1 | 1 | 129.35 | 0 | −1.22983 |
| 2 | 9 | 70.32 | 0.28696 | 0.17072 |
| 3 | 13 | −28.50 | −1.73172 | −1.69000 |
| 4 | 19 | 84.70 | 121.58232 | 121.55563 |
| 5 | 23 | 44.22 | −0.00435 | −0.00435 |

TABLE 2-continued

[Variable Distance Data]

|  | Infinity<br>f = 34.000 | Short-distance<br>β = −0.1877 |
|---|---|---|
| D0 | ∞ | 175.070 |
| D8 | 9.592 | 1.825 |
| D12 | 1.000 | 8.767 |
| D18 | 1.805 | 2.994 |
| D22 | 2.259 | 1.070 |
| D34 | 1.000 | 1.000 |

[Air Lens Data]
Air Convex Lens in the Intermediate Lens Group
R1=9491.3811 (15th Surface), R2=−44.64528 (14th Surface), Shape Factor=−0.990636502
Air Convex Lens in the Leading Lens Group
R1=29.24499 (2nd Surface), R2=−37.2885 (3rd Surface), Shape Factor=0.120894154

Figure 4A:
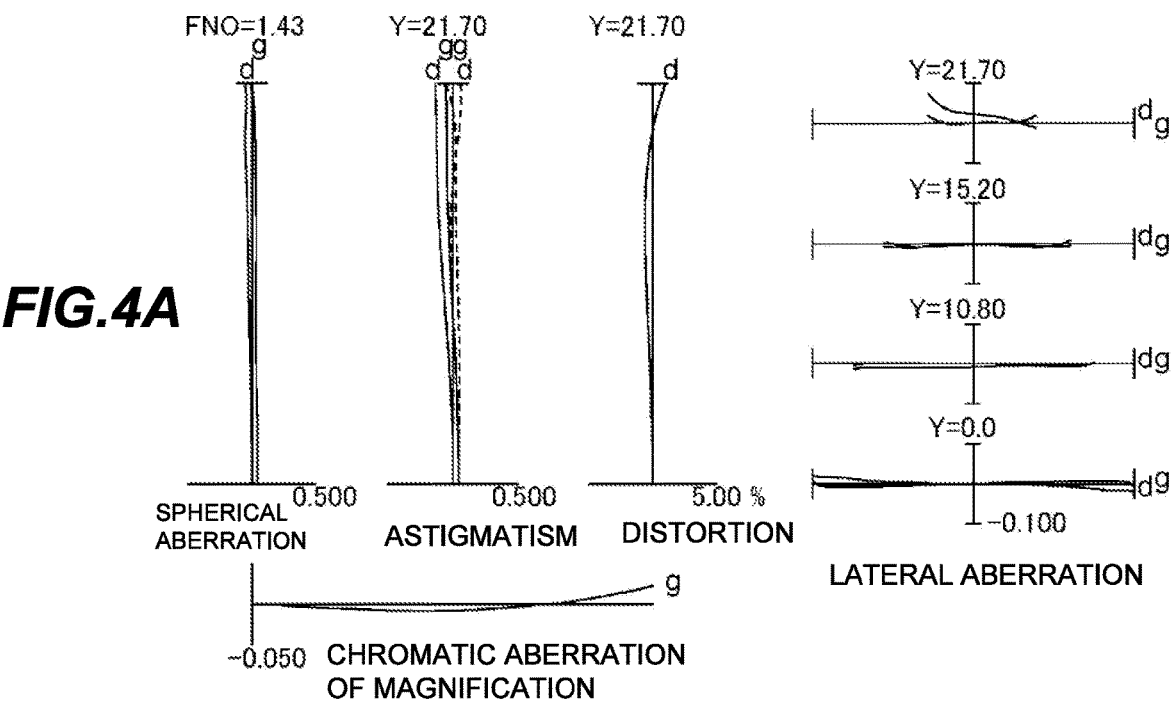
FIGS. 4A and 4B are diagrams of various aberrations of the optical system according to the Example 2, where
Figure 4B:
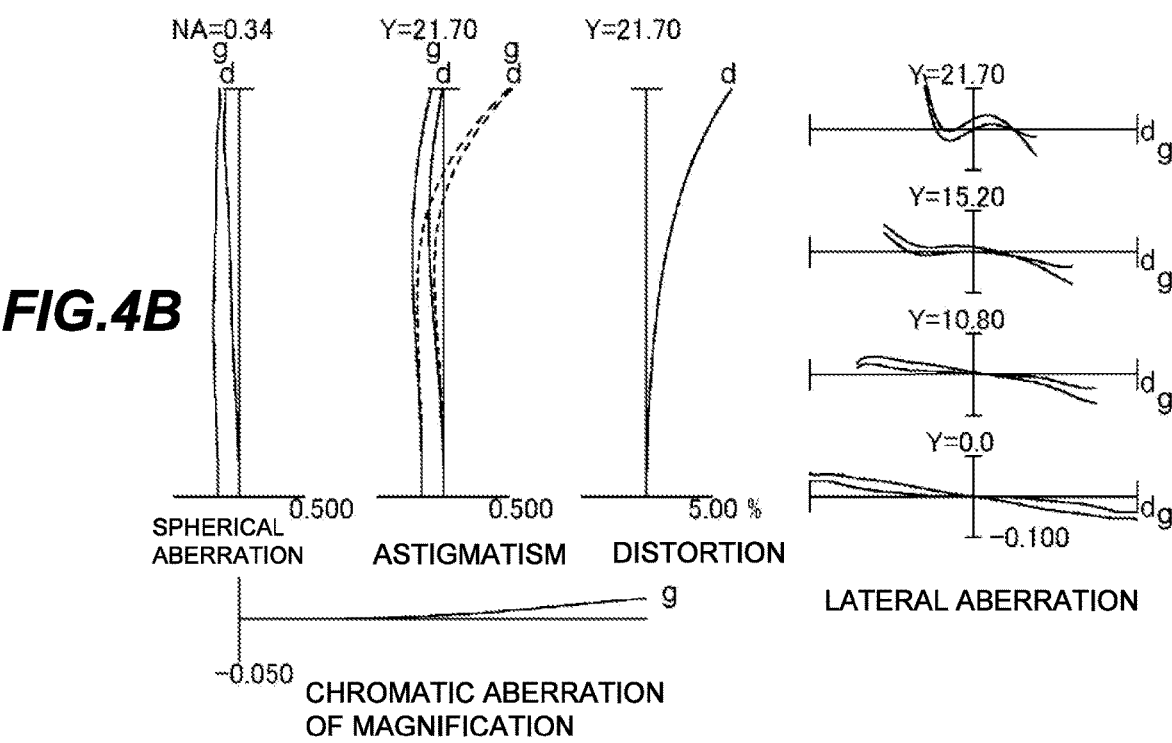

FIGS. 4A and 4B show various aberration values of the optical system according to the Example 2 upon focusing on an infinity object and upon focusing on a short distant object, respectively. From each aberration diagram, it can be seen that the optical system according to the Example 2 excellently corrects various aberrations and has excellent image formation performance.

Example 3

Example 3 will be described with reference to FIG. 5 FIGS. 6A and 6B and Table 3.

Figure 5:
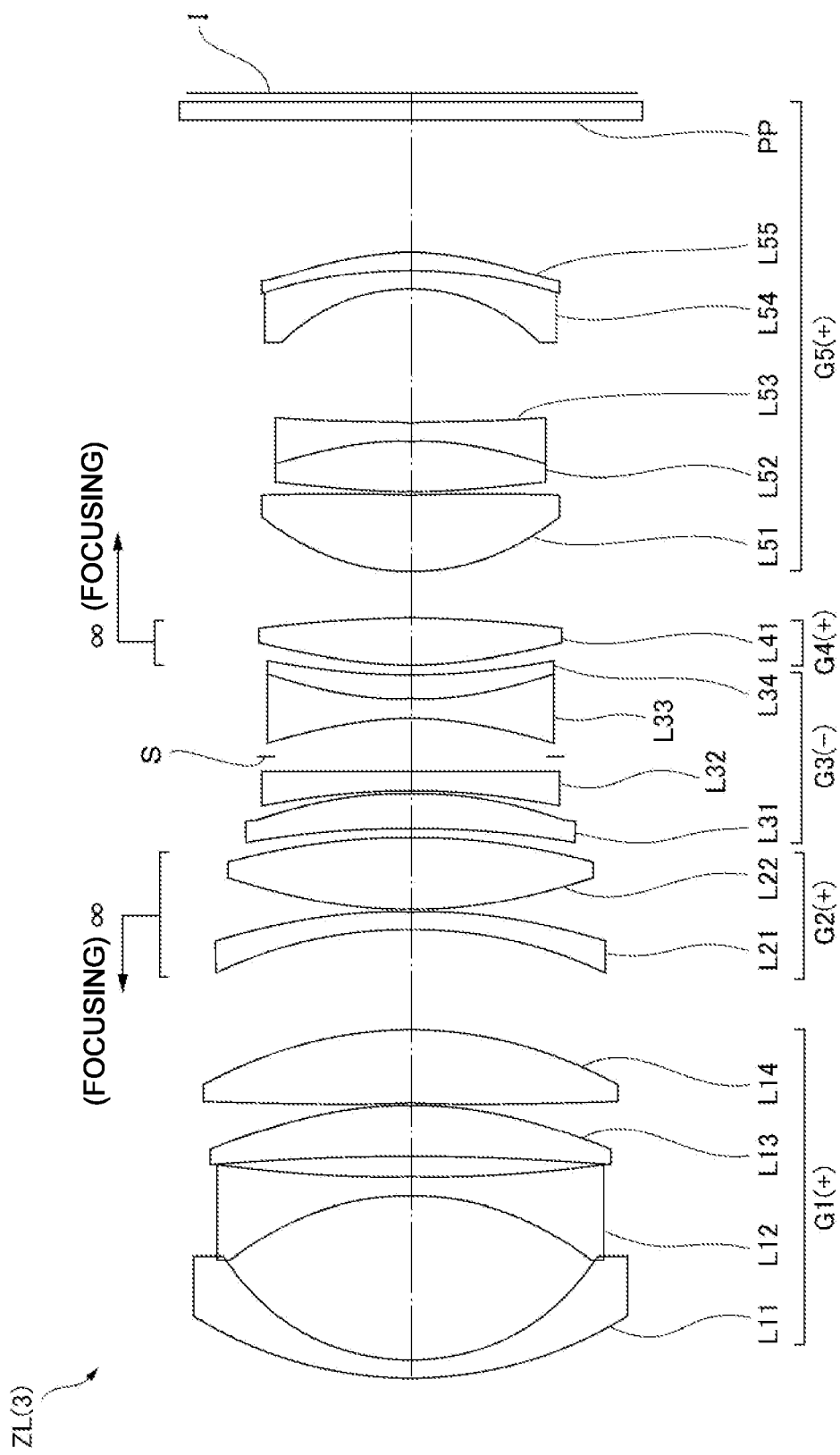
FIG. 5 is a diagram showing a lens configuration of an optical system according to Example 3.

FIG. 5 is a diagram showing a lens configuration of an optical system according to Example 3. A variable power optical system ZL (3) according to the Example 3 comprises a first lens group G1 (leading lens group) having positive refractive power, a second lens group G2 (first focusing lens group) having positive refractive power, a third lens group G3 (intermediate lens group) having negative refractive power, an aperture stop S arranged in the third lens group G3, a fourth lens group G4 (second focusing lens group) having positive refractive power, and a fifth lens group G5 (rear lens group) having positive refractive power, which are arranged in order from the object side.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing the object, a biconcave negative lens L12, a positive meniscus lens L13 having a concave surface facing the object, and a biconvex positive lens L14, which are arranged in order from the object side.

The second lens group G2 comprises a negative meniscus lens L21 having a concave surface facing the object, and a biconvex positive lens L22, which are arranged in order from the object side.

The third lens group G3 comprises a positive meniscus lens L31 having a concave surface facing the object, a biconcave negative lens L32, an aperture stop S, and a cemented negative lens including a biconcave negative lens L33 and a positive meniscus lens L34 having a convex surface facing the object, which are arranged in order from the object side. The negative lens L33 has an aspherical surface on the object side.

The fourth lens group G4 comprises a biconvex positive lens L41. The positive lens L41 has an aspherical surface on the image surface side.

The fifth lens group G5 comprises a biconvex positive lens L51, a cemented positive lens including a biconvex positive lens L52 and a biconcave negative lens L53, a cemented negative lens including a negative meniscus lens L54 having a concave surface facing the object and a positive meniscus lens L55 having a concave surface facing the object, and a parallel flat plate PP, which are arranged in order from the object side. The positive lens L52 has an aspherical surface on the object side. The positive meniscus lens L55 has an aspherical surface on the image surface side.

Table 3 shows values of various data on the optical system according to the Example 3.

TABLE 3

[General Data]

f = 34.000
FNo = 1.83
ω = 32.3°
Y = 21.7
TL = 125.016
BF = 15.36
BFa (Air equivalent length) = 14.815
NAi = 0.2636
NAm = 0.2869

[Lens Data]

| Surface<br>Number | R | D | nd | νd |
|---|---|---|---|---|
| Object<br>Surface | ∞ | | | |
| 1 | 39.26923 | 1.800 | 1.61272 | 58.5 |
| 2 | 21.43928 | 15.946 | | |
| 3 | −27.92891 | 1.800 | 1.72825 | 28.4 |
| 4 | 140.89907 | 2.034 | | |
| 5 | −202.15932 | 4.983 | 1.95375 | 32.3 |
| 6 | −45.11074 | 0.200 | | |
| 7 | 808.08718 | 7.245 | 1.77250 | 49.6 |
| 8 | −40.13154 | Variable (D8) | | |

TABLE 3-continued

| | | | | |
|---|---|---|---|---|
| 9 | −44.25220 | 1.800 | 1.84666 | 23.8 |
| 10 | −64.16132 | 0.200 | | |
| 11 | 51.93777 | 6.937 | 1.49782 | 82.6 |
| 12 | −68.38815 | Variable (D12) | | |
| 13 | −90.28877 | 3.400 | 1.49782 | 82.6 |
| 14 | −42.03280 | 0.200 | | |
| 15 | −71.85728 | 1.800 | 1.77250 | 49.6 |
| 16 | 988.62643 | 1.590 | | |
| 17 | S | 3.662 | | |
| 18* | −37.29234 | 1.800 | 1.69343 | 53.3 |
| 19 | 38.49299 | 2.412 | 1.94594 | 18.0 |
| 20 | 69.10901 | Variable (D20) | | |
| 21 | 51.49005 | 4.413 | 1.49710 | 81.5 |
| 22* | −123.19174 | Variable (D22) | | |
| 23 | 22.03371 | 7.573 | 1.49782 | 82.6 |
| 24 | −1063.13040 | 0.200 | | |
| 25* | 64.40483 | 4.966 | 1.74310 | 49.4 |
| 26 | −38.93018 | 1.800 | 1.80000 | 29.8 |
| 27 | 231.25275 | 13.146 | | |
| 28 | −17.57107 | 1.800 | 1.84666 | 23.8 |
| 29 | −44.05394 | 1.800 | 1.59201 | 67.0 |
| 30* | −26.89621 | 12.760 | | |
| 31 | 0 | 1.600 | 1.51680 | 64.1 |
| 32 | 0 | (D32) | | |
| Image Surface | ∞ | | | |

[Aspherical Surface Data]

18th Surface
K = 1.0000
A4 = 8.88687E−06, A6 = −4.33532E−09, A8 = −7.68001E−11, A10 = 2.47627E−13
22nd Surface
K = 1.0000
A4 = 5.79541E−07, A6 = 1.75128E−09, A8 = −6.35598E−11, A10 = 2.31873E−13
25th Surface
K = 1.0000
A4 = −1.22979E−05, A6 = 7.32190E−09, A8 = 6.68548E−12, A10 = 4.98302E−14
30th Surface
K = 1.0000
A4 = 1.67822E−05, A6 = 3.01627E−08, A8 = 1.09895E−10, A10 = 8.41007E−14

[Lens Group Data]

| Group | First surface | Focal length | Magnification (Infinity) | Magnification (Short-distance) |
|---|---|---|---|---|
| 1 | 1 | 146.26 | 0 | −1.43506 |
| 2 | 9 | 87.95 | 0.29093 | 0.16887 |
| 3 | 13 | −30.77 | −1.34774 | −1.23290 |
| 4 | 21 | 73.67 | −22.67267 | −22.62459 |
| 5 | 23 | 47.05 | 0.02615 | 0.02615 |

[Variable Distance Data]

| | Infinity f = 34.000 | Short-distance β = −0.1768 |
|---|---|---|
| D0 | ∞ | 175.030 |
| D8 | 9.608 | 1.000 |
| D12 | 1.000 | 9.608 |
| D20 | 1.000 | 4.541 |
| D22 | 4.541 | 1.000 |
| D32 | 1.000 | 1.000 |

[Air Lens Data]
Air Convex Lens in the Intermediate Lens Group
R1=988.62643 (16th Surface), R2=−37.29234 (17th Surface), Shape Factor=−0.927299624
Air Convex Lens in the Leading Lens Group
R1=21.43928 (2nd Surface), R2=−27.92891 (3rd Surface), Shape Factor=0.131453675

Figure 6A:
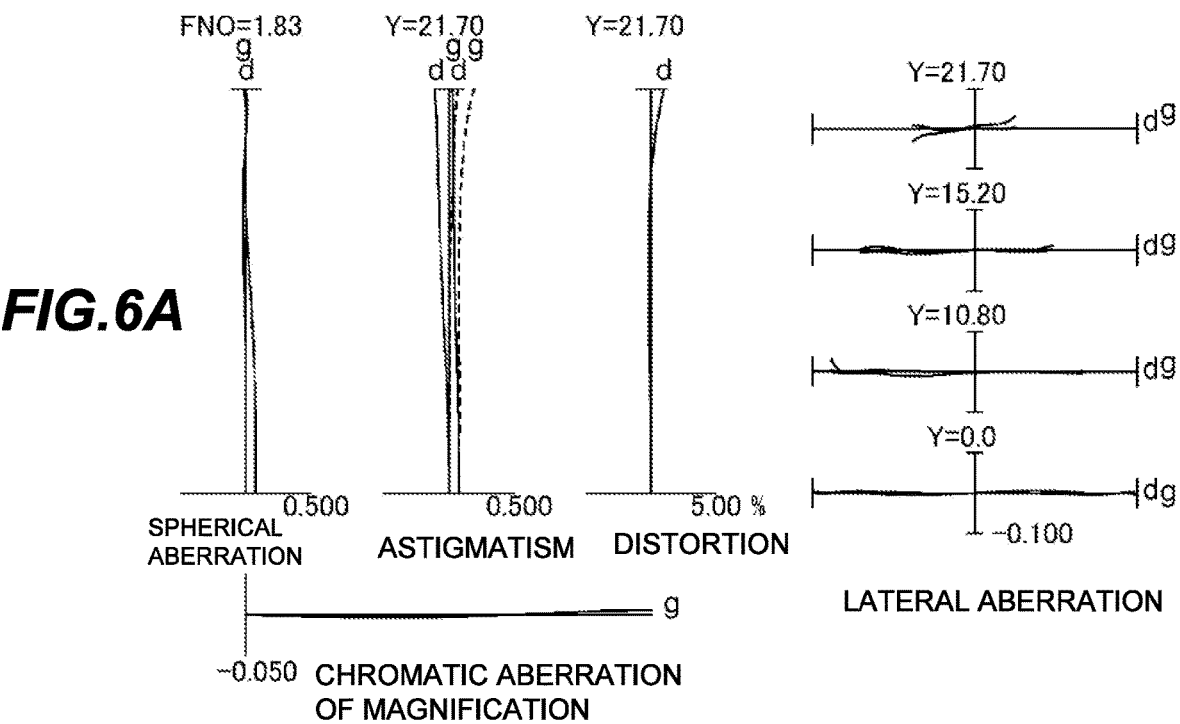
FIGS. 6A and 6B are diagrams of various aberrations of the optical system according to the Example 3, where
Figure 6B:
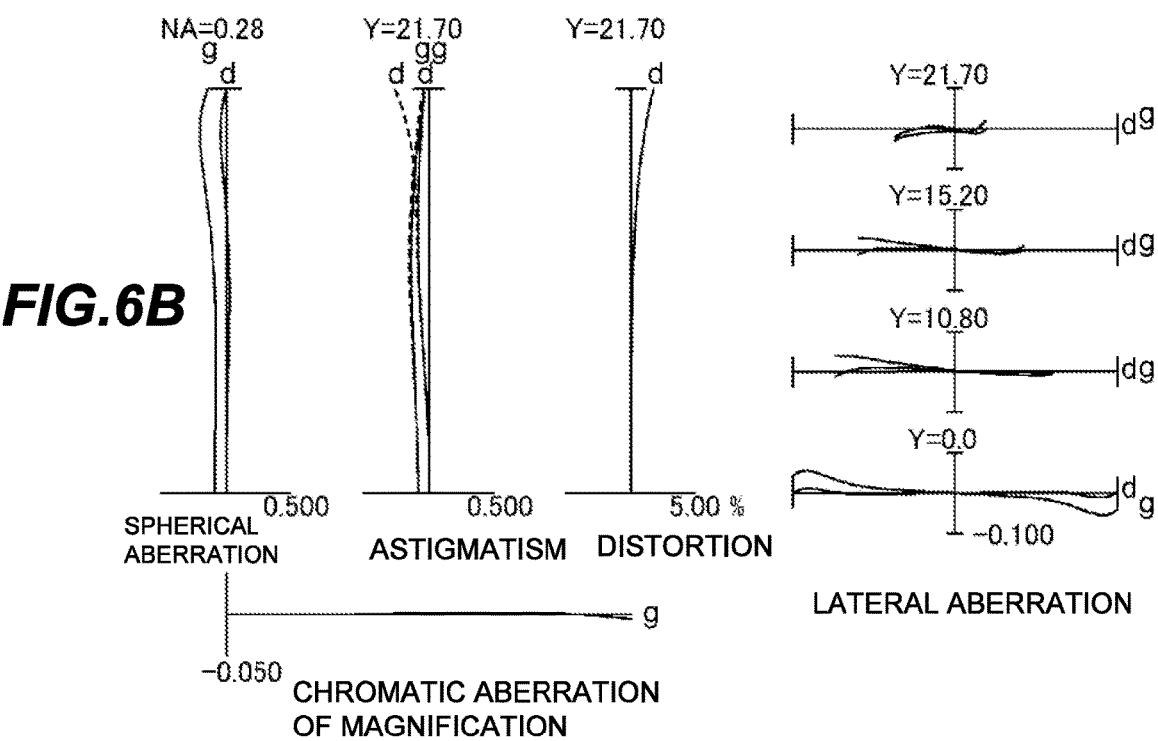

FIGS. 6A and 6B show various aberration values of an optical system according to the Example 3 upon focusing on an infinity object and upon focusing on a short distant object, respectively. From each aberration diagram, it can be seen that the optical system according to the Example 3 excellently corrects various aberrations and has excellent image formation performance.

Example 4

Example 4 will be described with reference to FIG. 7 FIGS. 8A and 8B, and Table 4.

Figure 7:
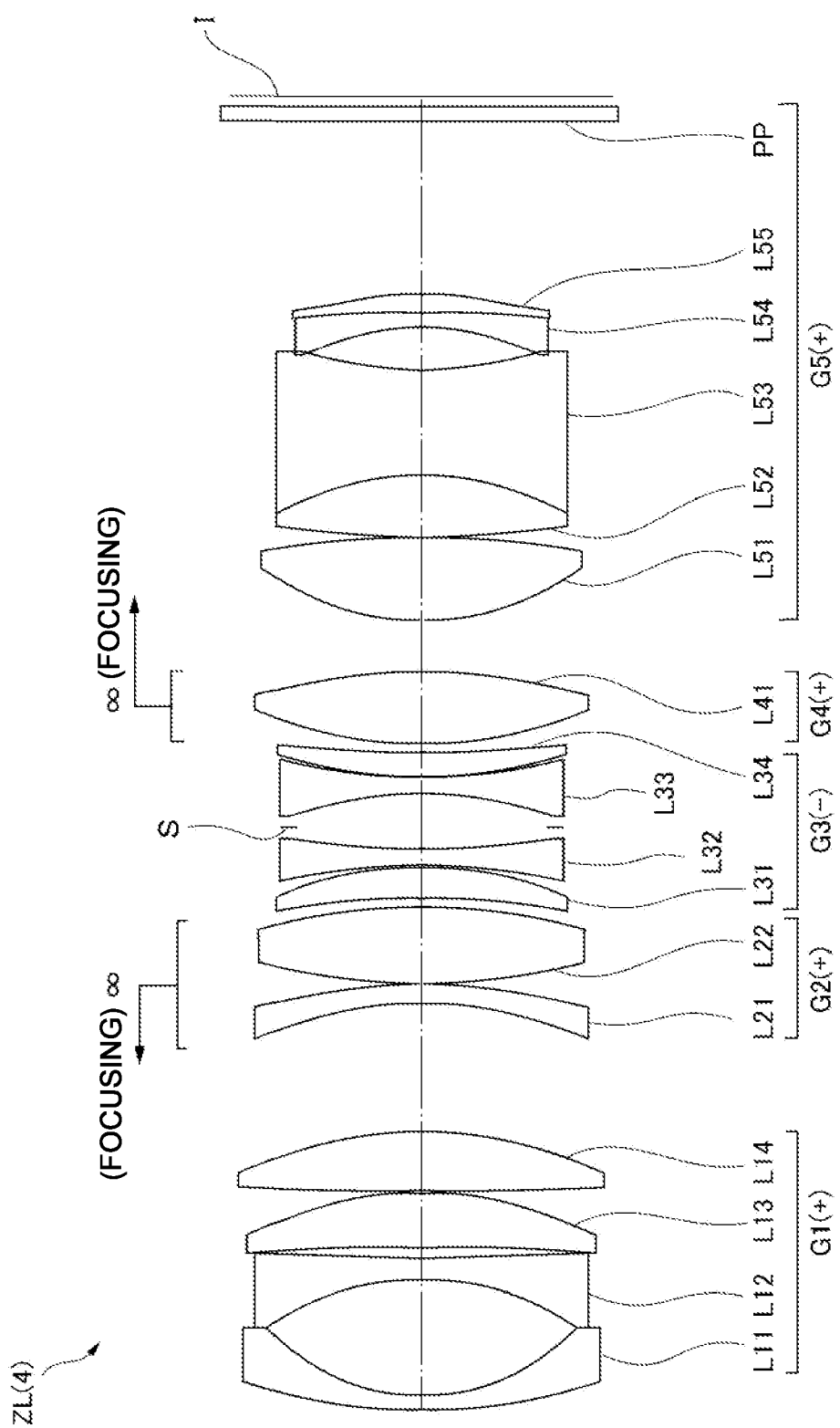
FIG. 7 is a diagram showing a lens configuration of an optical system according to Example 4.

FIG. 7 is a diagram showing a lens configuration of an optical system according to the Example 4. A variable power optical system ZL (4) according to the Example 4 comprises a first lens group G1 (leading lens group) having positive refractive power, a second lens group G2 (first focusing lens group) having positive refractive power, a third lens group G3 (intermediate lens group) having negative refractive power, an aperture stop S arranged in the third lens group G3, a fourth lens group G4 (second focusing lens group) having positive refractive power, and a fifth lens group G5 (rear lens group) having positive refractive power, which are arranged in order from the object side.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing the object, a biconcave negative lens L12, a positive meniscus lens L13 having a concave surface facing the object, and a biconvex positive lens L14, which are arranged in order from the object.

The second lens group G2 comprises a negative meniscus lens L21 having a concave surface facing the object and a biconvex positive lens L22, which are arranged in order from the object.

The third lens group G3 comprises a positive meniscus lens L31 having a concave surface facing the object, a biconcave negative lens L32, an aperture stop S, a biconcave negative lens L33, and a positive meniscus lens L34 having a convex surface facing the object, which are arranged in order from the object. The negative lens L33 has an aspherical surface on the image surface side.

The fourth lens group G4 comprises a biconvex positive lens L41. The positive lens L41 has an aspherical surface on the image surface side.

The fifth lens group G5 comprises a biconvex positive lens L51, a cemented negative lens including a biconvex positive lens L52 and a biconcave negative lens L53, a cemented negative lens including a negative meniscus lens L54 having a concave surface facing the object and a positive meniscus lens L55 having a concave surface facing the object, and a parallel flat plate PP, which are arranged in order from the object side. The positive lens L52 has an aspherical surface on the object side. The positive meniscus lens L55 has an aspherical surface on the image surface side.

Table 4 shows values of various data on the optical system according to the Example 4.

TABLE 4

| [General Data] |
|---|
| f = 34.000 |
| FNo = 1.83 |
| ω = 32.3° |
| Y = 21.7 |
| TL = 150.004 |
| BF = 22.354 |
| BFa (Air equivalent length) = 21.809 |
| NAi = 0.2636 |
| NAm = 0.3022 |

| [Lens Data] | | | | |
|---|---|---|---|---|
| Surface Number | R | D | nd | vd |
| Object Surface | ∞ | | | |
| 1 | 61.45190 | 1.800 | 1.60311 | 60.7 |
| 2 | 24.15620 | 13.126 | | |
| 3 | −30.14784 | 2.556 | 1.84666 | 23.8 |
| 4 | 411.13484 | 1.196 | | |
| 5 | −248.37149 | 6.178 | 1.84666 | 23.8 |
| 6 | −41.33060 | 0.200 | | |
| 7 | 571.61851 | 6.861 | 1.77250 | 49.6 |
| 8 | −46.37495 | Variable (D8) | | |
| 9 | −47.13156 | 2.200 | 1.84666 | 23.8 |
| 10 | −69.78753 | 0.200 | | |
| 11 | 75.23248 | 8.760 | 1.48749 | 70.3 |
| 12 | −66.21981 | Variable (D12) | | |
| 13 | −86.31055 | 3.444 | 1.49782 | 82.6 |
| 14 | −41.95582 | 0.200 | | |
| 15 | −73.08198 | 1.800 | 1.77250 | 49.6 |
| 16 | 95.40664 | 2.540 | | |
| 17 | S | 3.766 | | |
| 18 | −44.98778 | 1.800 | 1.69343 | 53.3 |
| 19* | 65.01667 | 0.200 | | |
| 20 | 59.01722 | 2.756 | 1.94594 | 18.0 |
| 21 | 177.88174 | Variable (D21) | | |
| 22 | 47.31354 | 8.236 | 1.49710 | 81.5 |
| 23* | −57.77206 | Variable (D23) | | |
| 24 | 29.89839 | 9.302 | 1.49782 | 82.6 |
| 25 | −124.65747 | 0.200 | | |
| 26* | 94.01782 | 7.112 | 1.74310 | 49.4 |
| 27 | −31.94679 | 12.000 | 1.73800 | 32.3 |
| 28 | 44.88495 | 4.885 | | |
| 29 | −29.01514 | 1.800 | 1.78472 | 25.6 |

TABLE 4-continued

| 30 | −122.38369 | 2.072 | 1.74310 | 49.4 |
|---|---|---|---|---|
| 31* | −37.12074 | 19.754 | | |
| 32 | 0 | 1.600 | 1.51680 | 64.1 |
| 33 Image Surface | 0 ∞ | (D33) | | |

[Aspherical Surface Data]

19th Surface
K = 1.0000
A4 = 5.84788E−07, A6 = −4.70258E−10, A8 = 1.13649E−11, A10 = −1.79719E−14

23rd Surface
K = 1.0000
A4 = 1.61554E−06, A6 = 5.75291E−09, A8 = −1.09239E−11, A10 = 1.27458E−14

26th Surface
K = 1.0000
A4 = −5.24945E−06, 1 A6 = 2.78999E−09, A8 = −3.58128E−12, A10 = 2.34155E−15

31st Surface
K = 1.0000
A4 = 1.59178E−05, A6 = 1.96622E−08, A8 = 1.10858E−10, A10 = −1.08461E−13

[Lens Group Data]

| Group | First surface | Focal length | Magnification (Infinity) | Magnification (Short-distance) |
|---|---|---|---|---|
| 1 | 1 | 253.20 | 0 | −31.51160 |
| 2 | 9 | 117.16 | 0.23631 | 0.01380 |
| 3 | 13 | −33.77 | −0.67127 | −0.53423 |
| 4 | 22 | 53.72 | −4.48399 | −4.39324 |
| 5 | 24 | 70.85 | 0.18879 | 0.18879 |

[Variable Distance Data]

| | Infinity f = 34.000 | Short-distance β = −0.1927 |
|---|---|---|
| D0 | ∞ | 150.040 |
| D8 | 14.584 | 1.421 |
| D12 | 1.000 | 14.163 |
| D21 | 1.000 | 5.876 |
| D23 | 5.876 | 1.000 |
| D33 | 1.000 | 1.000 |

[Air Lens Data]
Air Convex Lens in the Intermediate Lens Group
R1=95.40664 (16th Surface), R2=−44.98778 (18th Surface), Shape Factor=−0.359122962
Air Convex Lens in the Leading Lens Group
R1=24.15620 (2nd Surface), R2=−30.14784 (3rd Surface), Shape Factor=0.110335069

Figure 8A:
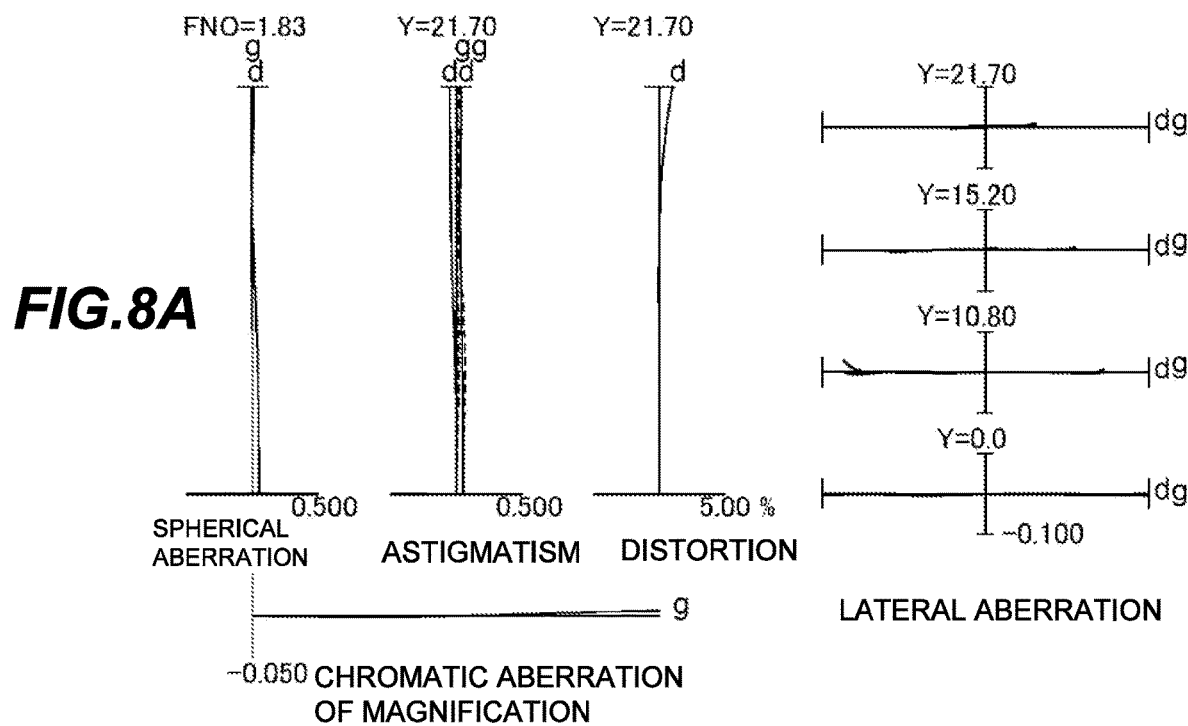
FIGS. 8A and 8B are diagrams of various aberrations of the optical system according to the Example 4, where
Figure 8B:
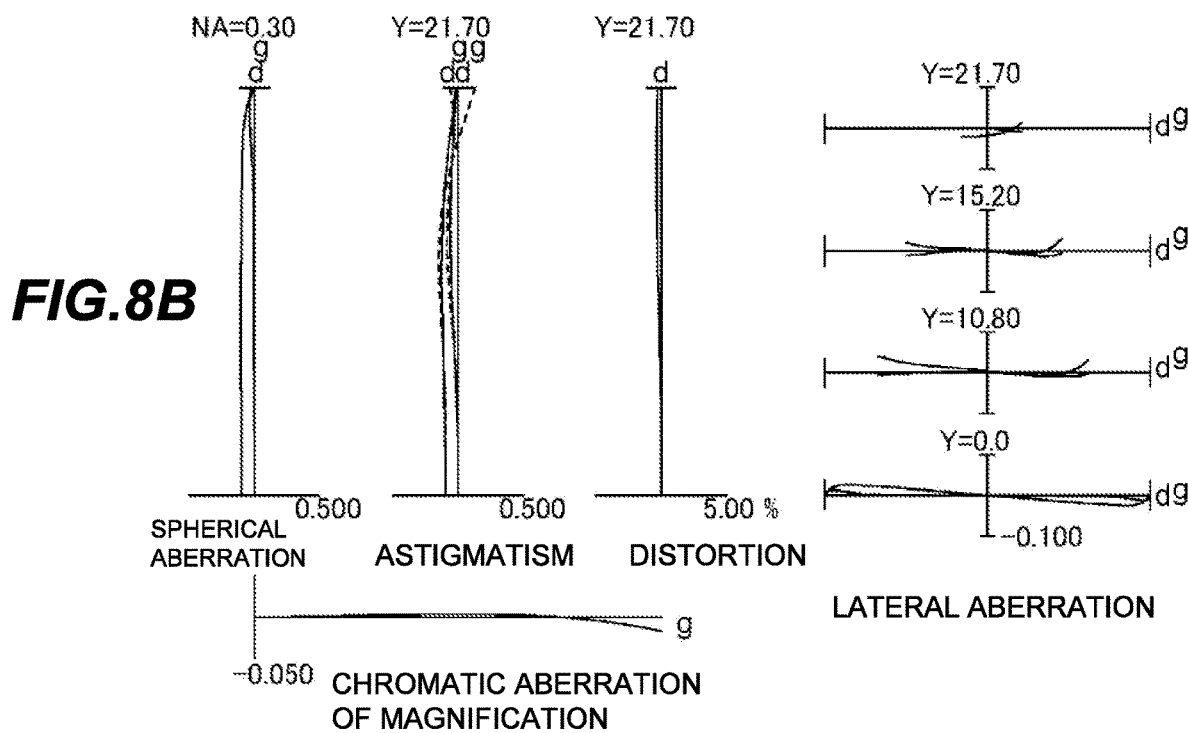

FIGS. 8A and 8B show various aberration values of the optical system according to the Example 4 upon focusing on an infinity object and upon focusing on a short distant object, respectively. From each aberration diagram, it can be seen that the optical system according to the Example 4 excellently corrects various aberrations and has excellent image formation performance.

Example 5

Example 5 will be described with reference to FIG. 9 FIGS. 10A and 10B, and Table 5.

FIG. 9 is a diagram showing a lens configuration of an optical system according to the Example 5. A variable power optical system ZL (5) according to the Example 5 comprises a first lens group G1 having negative refractive power, a second lens group G2 (first focusing lens group) having positive refractive power, a third lens group G3 (intermediate lens group) having positive refractive power, an aperture stop S arranged in the third lens group G3, a fourth lens group G4 (second focusing lens group) having negative refractive power, and a fifth lens group G5 (rear lens group) having positive refractive power, which are arranged in order from the object side. A front lens group comprises the first lens group G1 and the second lens group G2.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing the object, a cemented negative lens including a negative meniscus lens L12 having a convex surface facing the object and a positive meniscus lens L13 having a convex surface facing the object, and a cemented negative lens including a biconcave negative lens L14 and a biconvex positive lens L15, which are arranged in order from the object side.

The second lens group G2 comprises a negative meniscus lens L21 having a concave surface facing the object, and a biconvex positive lens L22, which are arranged in order from the object side. The negative meniscus lens L21 has an aspherical surface on the image surface side.

The third lens group G3 comprises a positive meniscus lens L31 having a concave surface facing the object, an aperture stop S, a cemented positive lens including a biconcave negative lens L32 and a biconvex positive lens L33, and a biconvex positive lens L34, which are arranged in order from the object side. The positive lens L33 has an aspherical surface on the image surface side.

The fourth lens group G4 comprises a biconcave negative lens L41. The negative lens L41 has an aspherical surface on the image surface side.

The fifth lens group G5 comprises a biconvex positive lens L51, a cemented negative lens including a positive meniscus lens L52 having a concave surface facing the object and a biconcave negative lens L53, a cemented negative lens including a positive meniscus lens L54 having a concave surface facing the object and a biconcave negative lens L55, and a parallel flat plate PP, which are arranged in order from the object side. The positive meniscus lens L54 has an aspherical surface on the object side.

Table 5 shows values of various data on the optical system according to the Example 5.

TABLE 5

[General Data]

f = 34.000
FNo = 1.23
ω = 32.2°
Y = 21.7
TL = 150.032
BF = 14.698
BFa (Air equivalent length) = 14.153

[Lens Data]

| Surface Number | R | D | nd | νd |
|---|---|---|---|---|
| Object Surface | ∞ | | | |
| 1 | 76.13006 | 3.000 | 1.48749 | 70.3 |
| 2 | 28.19692 | 7.115 | | |
| 3 | 45.00000 | 2.500 | 1.48749 | 70.3 |
| 4 | 26.27934 | 4.321 | 1.94594 | 18.0 |
| 5 | 30.02901 | 12.043 | | |
| 6 | −65.43865 | 1.800 | 1.67270 | 32.2 |
| 7 | 58.22961 | 9.828 | 1.95375 | 32.3 |
| 8 | −67.75158 | Variable (D8) | | |
| 9 | −41.64169 | 1.800 | 1.80301 | 25.5 |
| 10* | −102.52647 | 1.333 | | |
| 11 | 123.19210 | 9.223 | 1.59349 | 67.0 |
| 12 | −48.08539 | Variable (D12) | | |
| 13 | −59.34145 | 4.766 | 1.49782 | 82.6 |
| 14 | −38.44313 | 1.500 | | |
| 15 | ST | 4.305 | | |
| 16 | −70.75074 | 1.800 | 1.73800 | 32.3 |
| 17 | 32.10291 | 12.000 | 1.74310 | 49.4 |
| 18* | −67.58277 | 0.200 | | |
| 19 | 54.42040 | 11.512 | 1.49782 | 82.6 |
| 20 | −44.94038 | Variable (D20) | | |
| 21 | −89.95457 | 1.800 | 1.68893 | 31.2 |
| 22* | 37.28507 | Variable (D22) | | |
| 23 | 48.04763 | 7.028 | 1.94594 | 18.0 |
| 24 | −94.79098 | 0.200 | | |
| 25 | −1608.55410 | 6.876 | 1.84850 | 43.8 |
| 26 | −33.12297 | 1.800 | 1.75520 | 27.6 |
| 27 | 46.90755 | 4.956 | | |
| 28* | −1000.00000 | 1.778 | 1.88202 | 37.2 |
| 29 | −69.56777 | 1.800 | 1.68893 | 31.2 |
| 30 | 126.27453 | 12.098 | | |
| 31 | 0 | 1.600 | 1.51680 | 64.1 |
| 32 | 0 | (D32) | | |
| Image Surface | ∞ | | | |

[Aspherical Surface Data]

10th Surface
K = 1.0000
A4 = 3.07931E−06, A6 = 1.02113E−09, A8 = 6.79561E−13, A10 = 1.34649E−15

18th Surface
K = 1.0000
A4 = 5.15405E−06, A6 = 3.35051E−10, A8 = 4.01187E−12, A10 = 1.76325E−15

22nd Surface
K = 0.0000
A4 = −1.84764E−06, A6 = 4.29577E−09, A8 = −1.18420E−11, A10 = 1.99488E−14

28th Surface
K = 1.0000
A4 = −1.23474E−05, A6 = −1.08882E−08, A8 = −1.46450E−11, A10 = −3.75662E−14

TABLE 5-continued

[Lens Group Data]

| Group | First surface | Focal length | Magnification (Infinity) | Magnification (Short-distance) |
|---|---|---|---|---|
| 1 | 1 | −1313.18 | 0 | 1.10204 |
| 2 | 9 | 144.94 | −0.09157 | −1.13582 |
| 3 | 13 | 38.77 | 0.20953 | 0.11808 |
| 4 | 21 | −38.04 | 3.10241 | 2.99797 |
| 5 | 23 | 63.28 | 0.43496 | 0.43496 |

[Variable Distance Data]

| | Infinity f = 34.000 | Short-distance β = −0.1927 |
|---|---|---|
| D0 | ∞ | 150.03 |
| D8 | 11.884 | 3.852 |
| D12 | 1.000 | 9.032 |
| D20 | 1.000 | 4.973 |
| D22 | 6.166 | 2.193 |
| D32 | 1.000 | 1.000 |

[ Second lens group Cofiguration Data]

| | Focal length | R1 | R2 |
|---|---|---|---|
| First lens | −88.48936 | −41.64169 (9th Surface) | −102.52647 (10th Surface) |
| Second lens | 59.46773 | 123.19210 (11th Surface) | −48.08539 (12th Surface) |

[Air Lens Data]
Rear Group Air Convex Lens
R1=46.90755 (27th Surface), R2=−1000 (28th Surface), Shape Factor=0.910388362

Figure 10A:
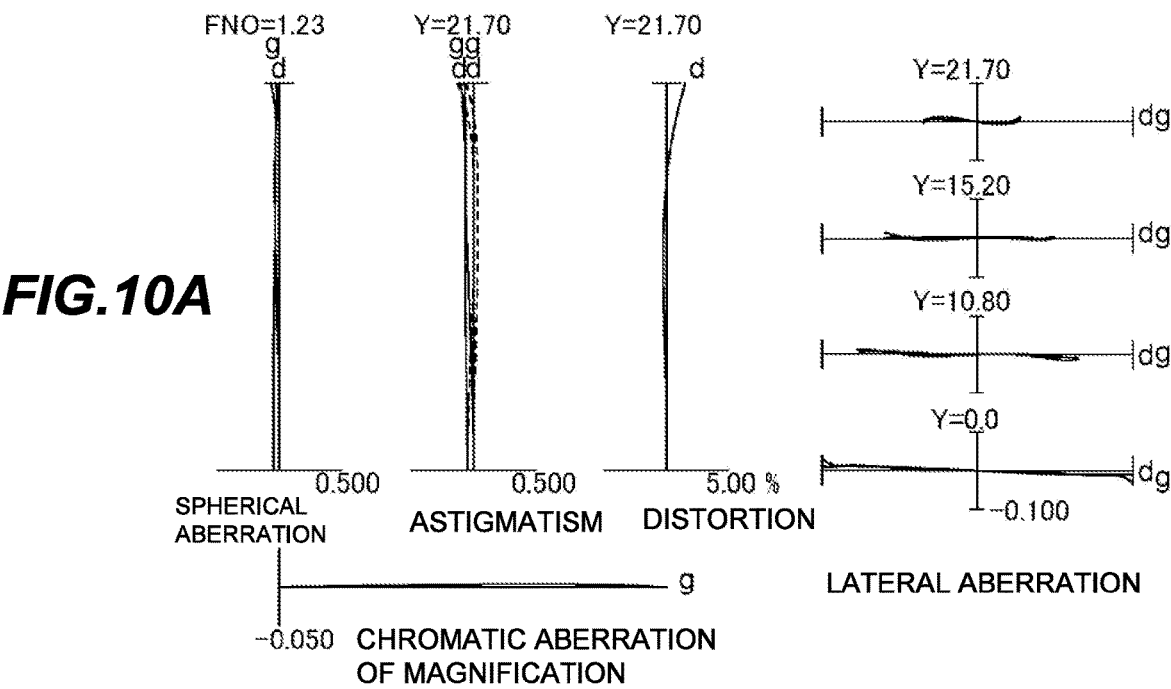
FIGS. 10A and 10B are diagrams of various aberrations of the optical system according to the Example 5, where
Figure 10B:
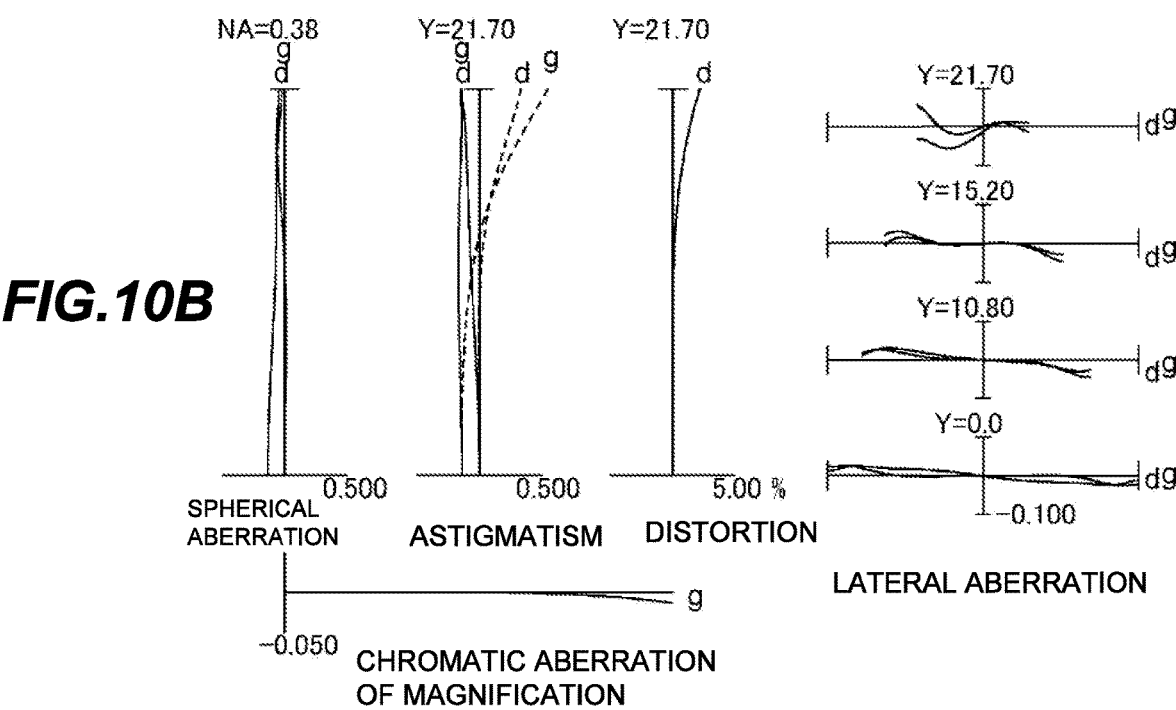

FIGS. 10A and 10B show various aberration values of the optical system according to the Example 5 upon focusing on an infinity object and upon focusing on a short distant object, respectively. From each aberration diagram, it can be seen that the optical system according to the Example 5 excellently corrects various aberrations and has excellent image formation performance.

Example 6

Example 6 will be described with reference to FIG. 11, FIGS. 12A and 12B, and Table 6.

Figure 11:
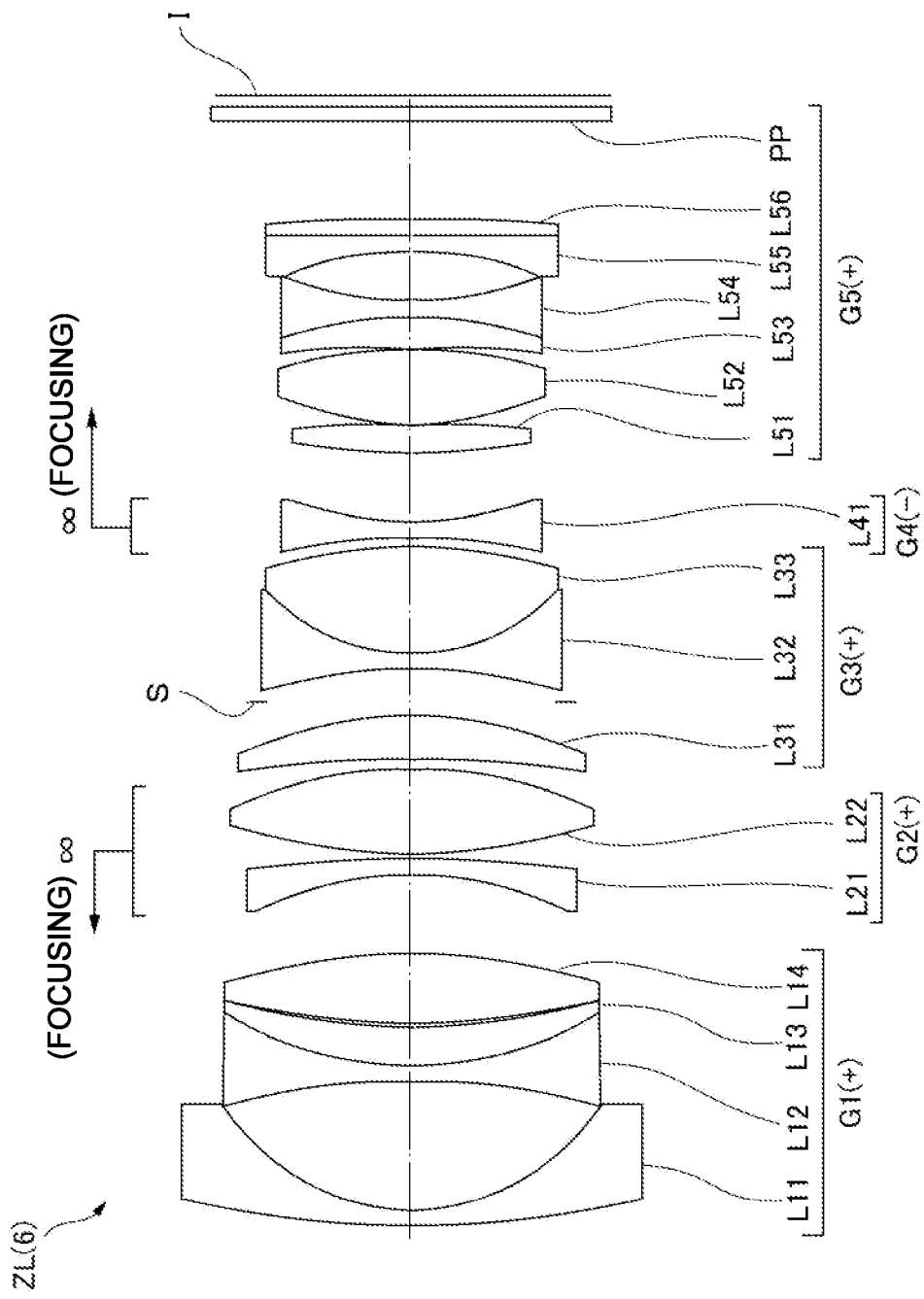
FIG. 11 is a diagram showing a lens configuration of an optical system according to Example 6.

FIG. 11 is a diagram showing a lens configuration of an optical system according to the Example 6. A variable power optical system ZL (6) according to the Example 6 comprises a first lens group G1 having positive refractive power, a second lens group G2 (first focusing lens group) having positive refractive power, a third lens group G3 (intermediate lens group) having positive refractive power, an aperture stop S arranged in the third lens group G3, a fourth lens group G4 (second focusing lens group) having negative refractive power, and a fifth lens group G5 (rear lens group) having positive refractive power, which are arranged in order from the object side. A front lens group comprises the first lens group G1 and the second lens group G2.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing an object, a cemented negative lens including a biconcave negative lens L12 and a positive meniscus lens L13 having a convex surface facing the object, and a biconvex positive lens L14, which are arranged in order from the object side.

The second lens group G2 comprises a negative meniscus lens L21 having a concave surface facing the object, and a biconvex positive lens L22, which are arranged in order from the object side. The negative meniscus lens L21 has an aspherical surface on the image surface side.

The third lens group G3 comprises a positive meniscus lens L31 having a concave surface facing the object, an aperture stop S, and a cemented positive lens including a biconcave negative lens L32 and a biconvex positive lens L33, which are arranged in order from the object side. The positive lens L33 has an aspherical surface on the image surface side.

The fourth lens group G4 comprises a biconcave negative lens L41. The negative lens L41 has an aspherical surface on the image surface side.

The fifth lens group G5 comprises a biconvex positive lens L51, a biconvex positive lens L52, a cemented negative lens including a positive meniscus lens L53 having a concave surface facing the object and a biconcave negative lens L54, a cemented negative lens including a biconcave negative lens L55 and a biconvex positive lens L56, and a parallel flat plate PP, which are arranged in order from the object side. The negative lens L55 has an aspherical surface on the object side.

Table 6 shows values of various data on the optical system according to the Example 6.

TABLE 6

[General Data]

f = 34.000
FNo = 1.43
ω = 32.2°
Y = 21.7
TL = 125.022
BF = 13.600
BFa (Air equivalent length) = 13.055

[Lens Data]

| Surface Number | R | D | nd | νd |
|---|---|---|---|---|
| Object Surface | ∞ | | | |
| 1 | 109.45238 | 1.800 | 1.49700 | 81.6 |
| 2 | 24.47498 | 14.265 | | |
| 3 | −78.28444 | 1.800 | 1.58144 | 41.0 |
| 4 | 40.43394 | 4.166 | 1.94594 | 18.0 |
| 5 | 71.96151 | 0.425 | | |
| 6 | 83.61518 | 7.612 | 1.88300 | 40.7 |
| 7 | −69.65237 | Variable (D7) | | |
| 8 | −39.56659 | 1.800 | 1.80301 | 25.5 |
| 9* | −90.71735 | 0.563 | | |
| 10 | 65.77353 | 9.415 | 1.59319 | 67.9 |
| 11 | −45.93702 | Variable (D11) | | |
| 12 | −138.84305 | 4.771 | 1.49782 | 82.6 |
| 13 | −45.83784 | 1.500 | | |
| 14 | ST | 3.722 | | |
| 15 | −59.21512 | 1.800 | 1.75520 | 27.6 |
| 16 | 22.18297 | 11.699 | 1.85108 | 40.1 |
| 17* | −46.92005 | Variable (D17) | | |
| 18 | −67.56515 | 1.800 | 1.58887 | 61.1 |
| 19* | 38.75771 | Variable (D19) | | |
| 20 | 77.17615 | 3.123 | 1.59319 | 67.9 |
| 21 | −218.81205 | 0.200 | | |
| 22 | 36.66031 | 8.301 | 1.59319 | 67.9 |
| 23 | −49.60222 | 0.200 | | |
| 24 | −154.73327 | 3.307 | 1.94594 | 18.0 |
| 25 | −45.87169 | 1.800 | 1.65412 | 39.7 |
| 26 | 38.62341 | 5.378 | | |
| 27* | −61.17607 | 1.800 | 1.74310 | 49.4 |
| 28 | 672.86578 | 1.800 | 1.95375 | 32.3 |
| 29 | −276.71080 | 11.000 | | |
| 30 | 0.00000 | 1.600 | 1.51680 | 64.1 |
| 31 | 0.00000 | (D31) | | |
| Image Surface | ∞ | | | |

[Aspherical Surface Data]

9th Surface
K = 1.0000
A4 = 3.97662E−06, A6 = 1.92523E−09, A8 = 1.13694E−12, A10 = 3.88285E−15
17th Surface
K = 1.0000
A4 = 6.69227E−06, A6 = 8.04126E−10, A8 = 1.94276E−12, A10 = 1.11930E−14
19th Surface
K = 1.0000
A4 = −2.40528E−06, A6 = 1.93829E−09, A8 = −6.30888E−12, A10 = 6.60932E−14
27th Surface
K = 1.0000
A4 = −2.15339E−05, A6 = −5.30707E−09, A8 = −1.26032E−10, A10 = 1.30698E−13

[Lens Group Data]

| Group | First surface | Focal length | Magnification (Infinity) | Magnification (Short-distance) |
|---|---|---|---|---|
| 1 | 1 | 1823.66 | 0 | 1.58128 |
| 2 | 8 | 87.69 | 0.03453 | −0.25825 |
| 3 | 12 | 58.66 | 0.44915 | 0.38745 |

TABLE 6-continued

| 4 | 18 | −41.56 | 3.44727 | 3.35196 |
| 5 | 20 | 54.64 | 0.34870 | 0.34870 |

[Variable Distance Data]

| | Infinity<br>f = 34.000 | Short-distance<br>β = −0.1849 |
|---|---|---|
| D0 | ∞ | 175.07 |
| D7 | 8.879 | 4.001 |
| D11 | 1.000 | 5.878 |
| D17 | 1.085 | 5.047 |
| D19 | 7.413 | 3.451 |
| D31 | 1.000 | 1.000 |

[ Second lens group Cofiguration Data]

| | Focal length | R1 | R2 |
|---|---|---|---|
| First lens | −88.77822 | −39.56659<br>(8th Surface) | −90.71735<br>(9th Surface) |
| Second lens | 47.07304 | 65.77353<br>(11th Surface) | −45.93702<br>(12th Surface) |

[Air Lens Data]
Rear Group Air Convex Lens
R1=38.62341 (26th Surface), R2=−61.17607 (27th Surface), Shape Factor=0.225979735

Figure 12A:
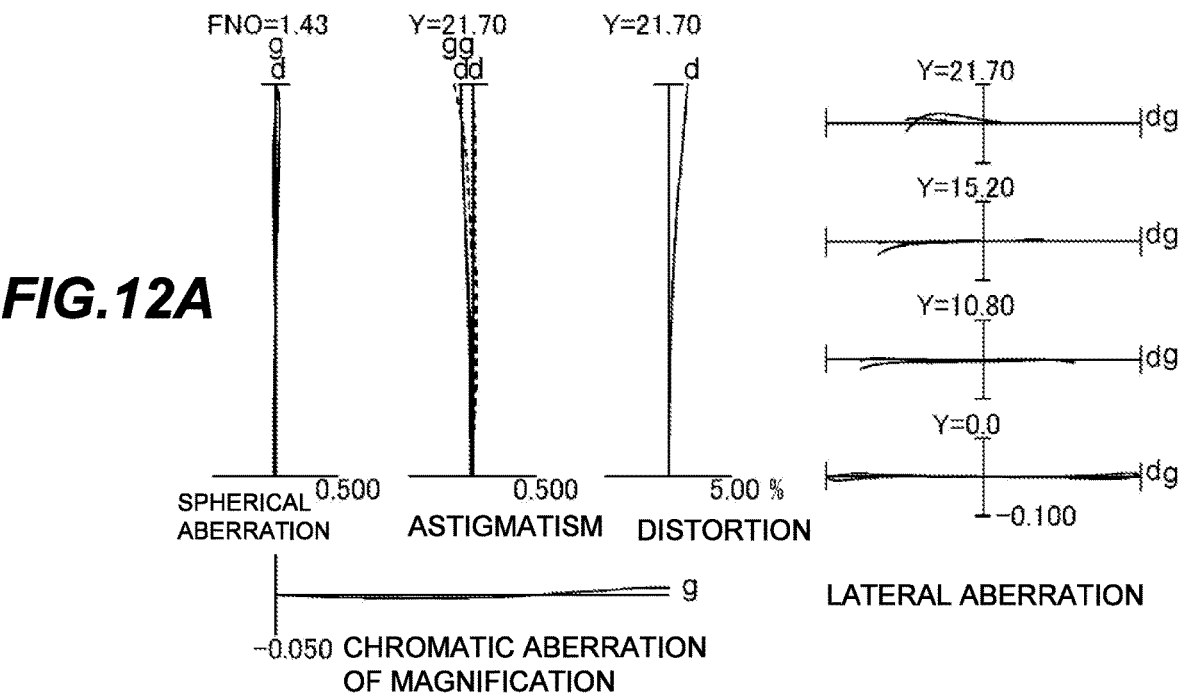
FIGS. 12A and 12B are diagrams of various aberrations of the optical system according to the Example 6, where
Figure 12B:
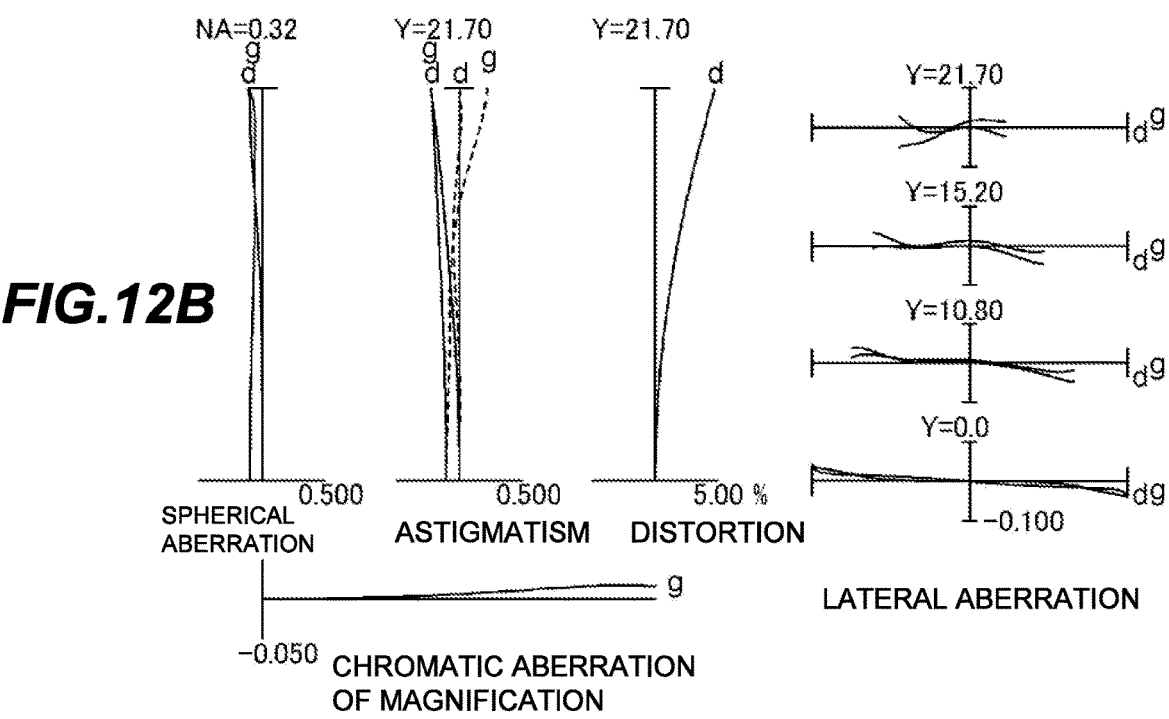

FIGS. 12A and 12B show various aberration values of the optical system according to the Example 6 upon focusing on an infinity object and upon focusing on a short distant object, respectively. From each aberration diagram, it can be seen that the optical system according to the Example 6 excellently corrects various aberrations and has excellent image formation performance.

Example 7

Example 7 will be described with reference to FIG. 13, FIGS. 14A and 14B, and Table 7.

Figure 13:
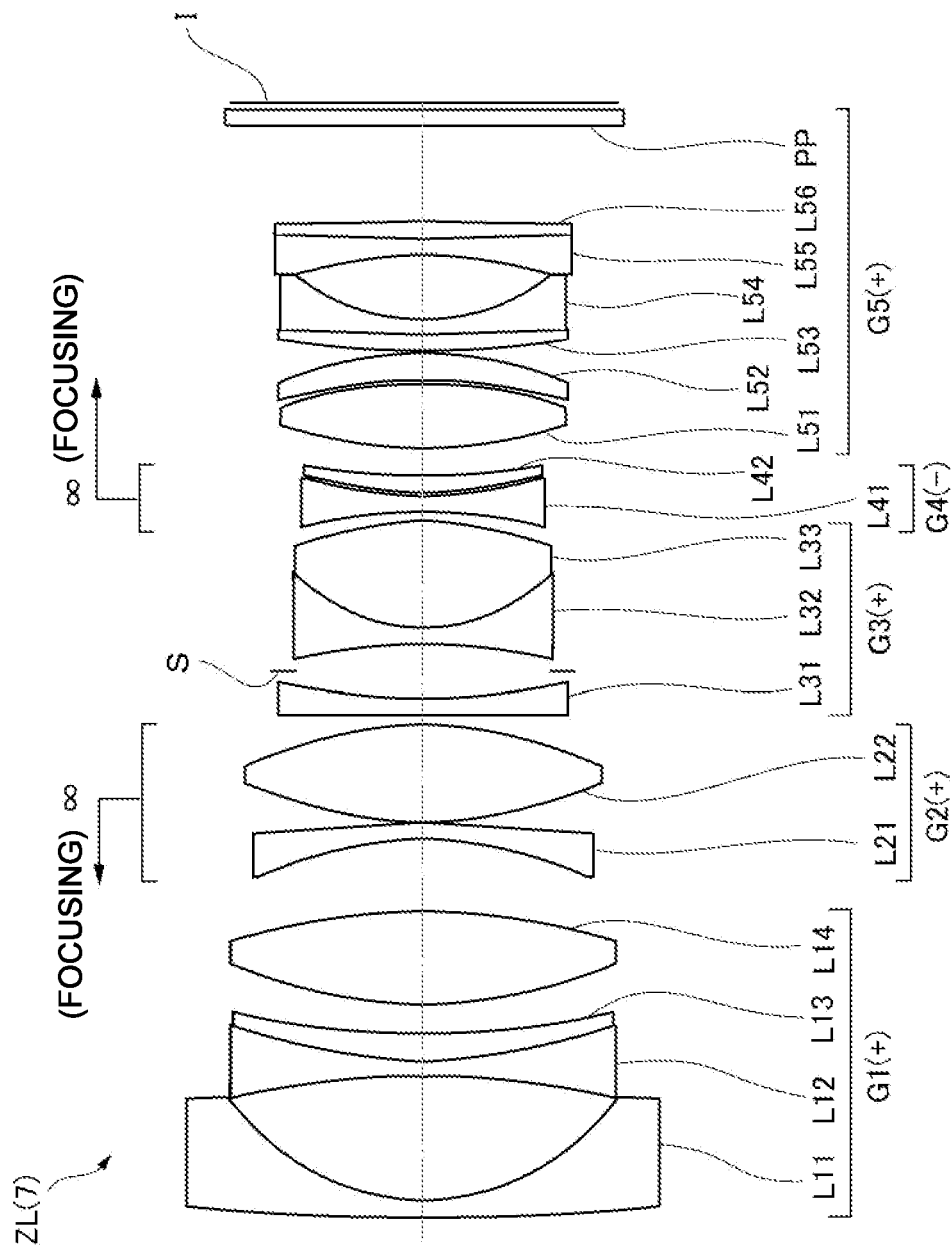
FIG. 13 is a diagram showing a lens configuration of an optical system according to Example 7.

FIG. 13 is a diagram showing a lens configuration of an optical system according to Example 7. A variable power optical system ZL (7) according to the Example 7 comprises a first lens group G1 having positive refractive power, a second lens group G2 (first focusing lens group) having positive refractive power, a third lens group G3 (intermediate lens group) having positive refractive power, an aperture stop S arranged in the third lens group G3, a fourth lens group G4 (second focusing lens group) having negative refractive power, and a fifth lens group G5 (rear lens group) having positive refractive power, which are arranged in order from the object side. A front lens group comprises the first lens group G1 and the second lens group G2.

The positions of the first lens group G1, the third lens group G3, and the fifth lens group G5 are fixed, and the second lens group G2 and the fourth lens group G4 are arranged so as to be movable along an optical axis. Upon focusing from infinity onto a short distance, the second lens group G2 moves in a direction to an object, and the fourth lens group G4 moves in a direction to an image surface.

The first lens group G1 comprises a negative meniscus lens L11 having a convex surface facing the object, a cemented negative lens including a biconcave negative lens L12 and a positive meniscus lens L13 having a convex surface facing the object, and a biconvex positive lens L14, which are arranged in order from the object side.

The second lens group G2 comprises a negative meniscus lens L21 having a concave surface facing the object, and a biconvex positive lens L22, which are arranged in order from the object side. The negative meniscus lens L21 has an aspherical surface on the image surface side. The positive lens L22 has an aspherical surface on the image surface side.

The third lens group G3 comprises a biconcave negative lens L31, an aperture stop S, and a cemented positive lens including a biconcave negative lens L32 and a biconvex positive lens L33, which are arranged in order from the object side. The positive lens L33 has an aspherical surface on the image surface side.

The fourth lens group G4 comprises a biconcave negative lens L41, and a positive meniscus lens L42 having a convex surface facing the object, which are arranged in order from the object side.

The fifth lens group G5 comprises a biconvex positive lens L51, a positive meniscus lens L52 having a concave surface facing the object, a cemented negative lens including a positive meniscus lens L53 having a convex surface facing the object and a negative meniscus lens L54 having a convex surface facing the object, a cemented negative lens including a biconcave negative lens L55 and a biconvex positive lens L56, and a parallel flat plate PP, which are arranged in order from the object side. The positive lens L51 has an aspherical surface on the object side.

Table 7 shows values of various data on the optical system according to the Example 7.

TABLE 7

[General Data]

f = 34.000
FNo = 1.43
ω = 33.0°

TABLE 7-continued

Y = 21.7
TL = 125.023
BF = 13.600
BFa (Air equivalent length) = 13.055

[Lens Data]

| Surface Number | R | D | nd | vd |
|---|---|---|---|---|
| Object Surface | ∞ | | | |
| 1 | 273.13198 | 1.800 | 1.49782 | 82.6 |
| 2 | 26.63571 | 13.925 | | |
| 3 | −98.52314 | 1.800 | 1.48749 | 70.3 |
| 4 | 58.60262 | 3.152 | 1.94594 | 18.0 |
| 5 | 101.66252 | 3.142 | | |
| 6 | 53.75225 | 10.436 | 1.75500 | 52.3 |
| 7 | −71.61260 | Variable (D7) | | |
| 8 | −45.10806 | 1.800 | 1.80301 | 25.5 |
| 9* | −116.80856 | 0.200 | | |
| 10 | 47.22397 | 10.971 | | |
| 11* | −40.13400 | Variable (D11) | | |
| 12 | −1586.66260 | 1.800 | 1.72825 | 28.4 |
| 13 | 68.71244 | 3.086 | | |
| 14 | ST | 3.025 | | |
| 15 | −68.57829 | 1.800 | 1.73800 | 32.3 |
| 16 | 20.10969 | 12.000 | 1.74310 | 49.4 |
| 17* | −33.24316 | Variable (D17) | | |
| 18 | −59.11057 | 1.800 | 1.73800 | 32.3 |
| 19 | 46.22177 | 0.241 | | |
| 20 | 45.59886 | 1.881 | 1.94594 | 18.0 |
| 21 | 70.00265 | Variable (D21) | | |
| 22* | 47.37733 | 7.186 | 1.88202 | 37.2 |
| 23 | −49.42639 | 0.200 | | |
| 24 | −64.96238 | 3.324 | 1.49782 | 82.6 |
| 25 | −40.20650 | 0.200 | | |
| 26 | 101.56843 | 1.800 | 1.88300 | 40.7 |
| 27 | 209.60218 | 1.800 | 1.61266 | 44.5 |
| 28 | 24.65699 | 7.101 | | |
| 29 | −50.06935 | 1.800 | 1.55298 | 55.1 |
| 30 | 360.47016 | 1.800 | 1.95375 | 32.3 |
| 31 | −492.61890 | 11.000 | | |
| 32 | 0 | 1.600 | 1.51680 | 64.1 |
| 33 | 0 | (D33) | | |
| Image Surface | ∞ | | | |

[Aspherical Surface Data]

9th Surface
K = 1.0000
A4 = 3.85233E−06, A6 = −3.31696E−10, A8 = 1.06184E−13, A10 = −6.34887E−15

11th Surface
K = 1.0000
A4 = 3.77821E−06, A6 = 2.86601E−09, A8 = −2.15078E−12, A10 = 4.16703E−15

17th Surface
K = 1.0000
A4 = 1.14653E−05, A6 = 3.35768E−10, A8 = 2.01141E−11, A10 = −1.03562E−15

22nd Surface
K = 1.0000
A4 = −5.47144E−06, A6 = −7.00429E−09, A8 = 1.65756E−11, A10 = −1.71978E−14

[Lens Group Data]

| Group | First surface | Focal length | Magnification (Infinity) | Magnification (Short-distance) |
|---|---|---|---|---|
| 1 | 1 | 113.48 | 0 | −1.00482 |
| 2 | 8 | 59.44 | 0.29513 | 0.18580 |
| 3 | 12 | 180.29 | 1.03982 | 1.02781 |
| 4 | 18 | −46.77 | 3.97828 | 3.92885 |
| 5 | 22 | 46.19 | 0.24541 | 0.24541 |

TABLE 7-continued

[Variable Distance Data]

| | Infinity<br>f = 34.000 | Short-distance<br>β = −0.1850 |
|---|---|---|
| D0 | ∞ | 175.05 |
| D7 | 8.039 | 3.567 |
| D11 | 1.000 | 5.472 |
| D17 | 1.000 | 3.313 |
| D21 | 3.313 | 1.000 |
| D33 | 1.000 | 1.001 |

[Second lens group Cofiguration Data]

| | Focal length | R1 | R2 |
|---|---|---|---|
| First lens | −92.54837 | −45.10806<br>(8th Surface) | −116.80856<br>(9th Surface) |
| Second lens | 38.44280 | 47.22397<br>(10th Surface) | −40.13400<br>(11th Surface) |

[Air Lens Data]
Rear Group Air Convex Lens
R1=24.65699 (28th Surface), R2=−50.06935 (29th Surface), Shape Factor=0.340072323

Figure 14A:
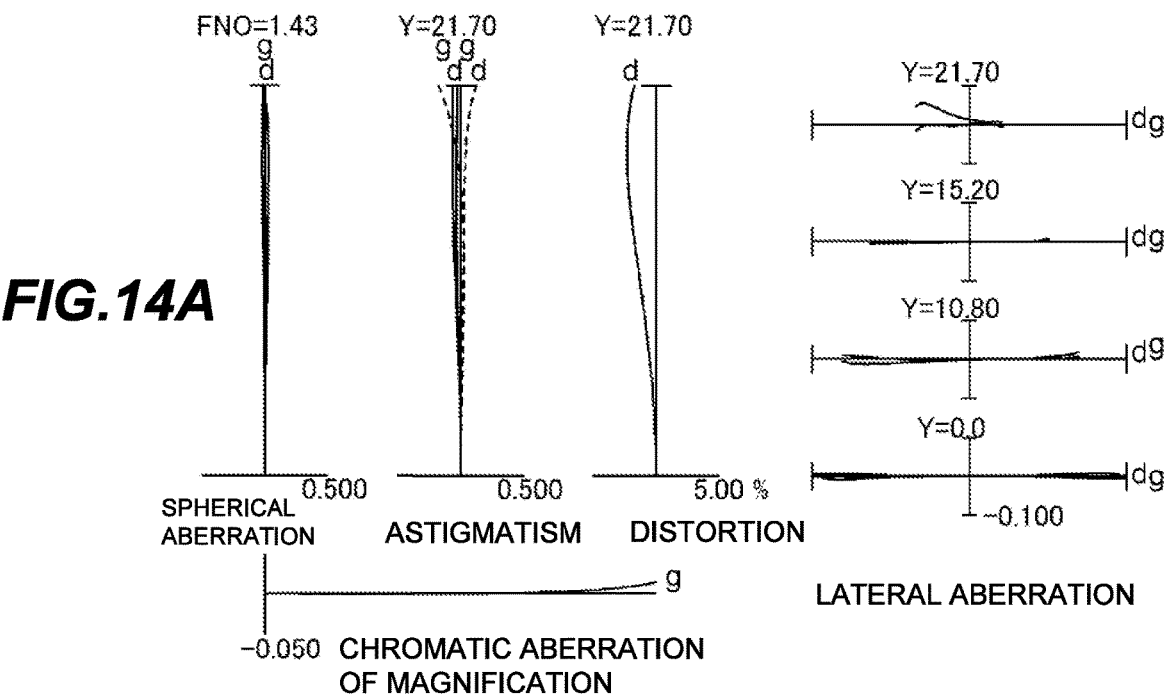
FIGS. 14A and 14B are diagrams of various aberrations of the optical system according to the Example 7, where
Figure 14B:
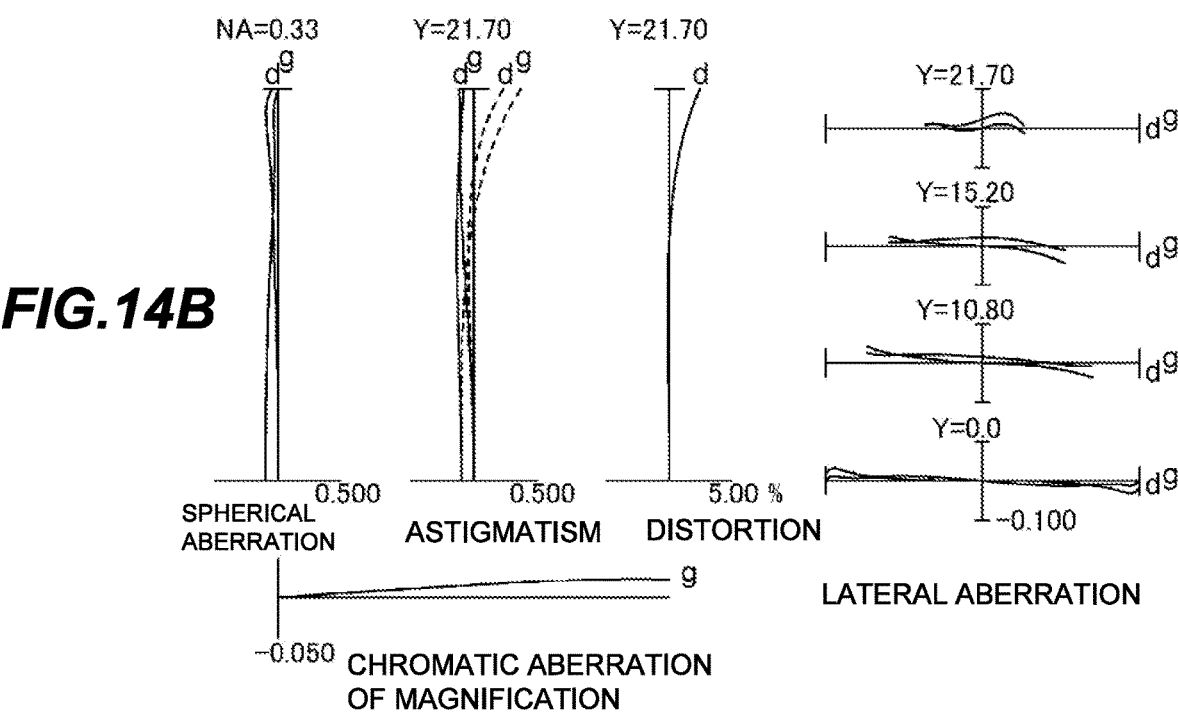

FIGS. 14A and 14B show various aberration values of the optical system according to the Example 7 upon focusing on an infinity object and upon focusing on a short distant object, respectively. From each aberration diagram, it can be seen that the optical system according to the Example 7 excellently corrects various aberrations and has excellent image formation performance.

Example 8

Example 8 will be described with reference to FIG. 15, FIGS. 16A and 16B, and Table 8.

Figure 15:
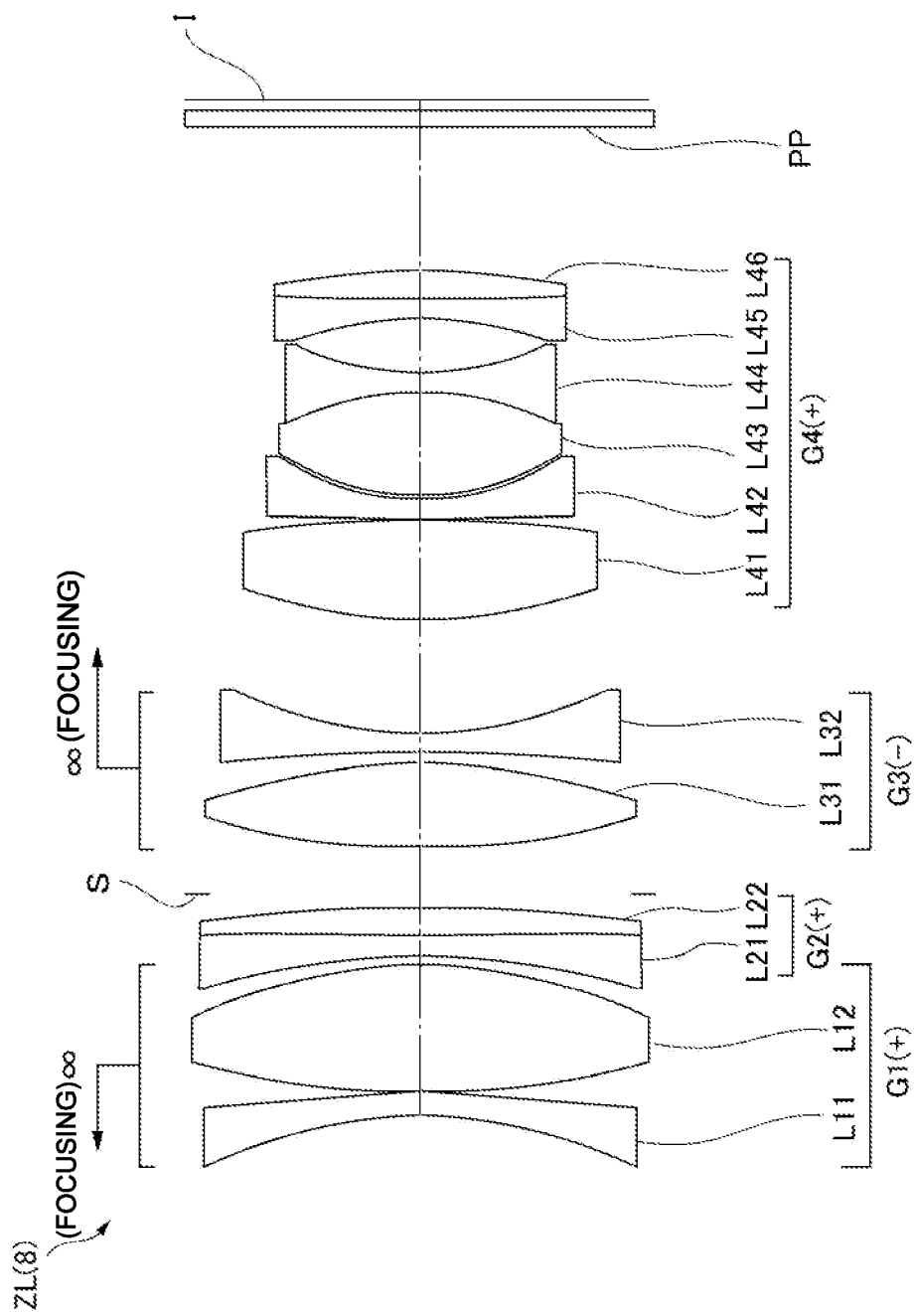
FIG. 15 is a diagram showing a lens configuration of an optical system according to Example 8.

FIG. 15 is a diagram showing a lens configuration of an optical system according to the Example 8. A variable power optical system ZL (8) according to the Example 8 comprises a first lens group G1 (first focusing lens group) having positive refractive power, a second lens group G2 (intermediate lens group) having positive refractive power, an aperture stop S arranged in the second lens group G2, a third lens group G3 (second focusing lens group) having negative refractive power, and a fourth lens group G4 (rear lens group) having positive refractive power, which are arranged in order from the object side. A front lens group comprises the first lens group G1.

The positions of the second lens group G2 and the fourth lens group G4 are fixed, and the first lens group G1 and the third lens group G3 are arranged to be movable along an optical axis. Upon focusing from infinity onto a short distance, the first lens group G1 moves in a direction to an object, and the third lens group G3 moves in a direction to an image surface.

The first lens group G1 comprises a negative meniscus lens L11 having a concave surface facing the object and a biconvex positive lens L12, which are arranged in order from the object side. The negative meniscus lens L11 has an aspherical surface on the image surface side. The positive lens L12 has an aspherical surface on the image surface side.

The second lens group G2 comprises a cemented negative lens including a biconcave negative lens L21 and a biconvex positive lens L22, an aperture stop S, and a biconvex positive lens L23, which are arranged in order from the object side. The positive lens L23 is an aspherical surface on the image surface side.

The third lens group G3 comprises a biconcave negative lens L31.

The fourth lens group G4 comprises a biconvex positive lens L41, a negative meniscus lens L42 having a convex surface facing the object, a cemented positive lens including a biconvex positive lens L43 and a biconcave negative lens L44, a cemented negative lens including a biconcave negative lens L45 and a biconvex positive lens L46, and a parallel flat plate PP, which are arranged in order from the object side. The positive lens L46 has an aspherical surface on the image surface side.

Table 8 shows values of various data on the optical system according to the Example 8.

TABLE 8

[General Data]

f = 50.910
FNo = 1.43
ω = 22.8°
Y = 21.7
TL = 95.871
BF = 16.056
BFa (Air equivalent length) = 15.510

TABLE 8-continued

[Lens Data]

| Surface Number | R | D | nd | vd |
|---|---|---|---|---|
| Object Surface | ∞ | | | |
| 1 | −45.53128 | 2.000 | 1.80301 | 25.5 |
| 2* | −111.79675 | 0.200 | | |
| 3 | 83.73710 | 12.000 | 1.59201 | 67.0 |
| 4* | −49.75520 | Variable (D4) | | |
| 5 | −68.03249 | 1.800 | 1.73800 | 32.3 |
| 6 | 1749.28940 | 2.677 | 1.94594 | 18.0 |
| 7 | −155.93999 | 1.500 | | |
| 8 | ST | 4.123 | | |
| 9 | 71.59071 | 7.854 | 1.49710 | 81.5 |
| 10* | −54.23941 | Variable (D10) | | |
| 11 | −219.41482 | 1.800 | 1.48749 | 70.3 |
| 12 | 39.44184 | Variable (D12) | | |
| 13 | 47.97944 | 9.342 | 1.88300 | 40.7 |
| 14 | −135.75041 | 0.200 | | |
| 15 | 545.97895 | 1.800 | 1.61266 | 44.5 |
| 16 | 23.28740 | 0.200 | | |
| 17 | 23.74117 | 9.978 | 1.84850 | 43.8 |
| 18 | −29.27432 | 1.800 | 1.73800 | 32.3 |
| 19 | 26.87419 | 5.111 | | |
| 20 | −34.55237 | 1.800 | 1.84666 | 23.8 |
| 21 | 406.87881 | 2.828 | 1.74310 | 49.4 |
| 22* | −48.46023 | 13.455 | | |
| 23 | 0 | 1.600 | 1.51680 | 64.1 |
| 24 | 0 | (D24) | | |
| Image Surface | ∞ | | | |

[Aspherical Surface Data]

2nd Surface
K = 1.0000
A4 = 3.11319E−06, A6 = 1.64862E−10, A8 = 2.89903E−13, A10 = 1.18346E−15
4th Surface
K = 1.0000
A4 = −1.09516E−06, A6 = 2.90379E−09, A8 = −4.49476E−12, A10 = 2.65768E−15
10th Surface
K = 1.0000
A4 = 3.59763E−06, A6 = −2.76589E−09, A8 = 6.50200E−12, A10 = −5.25418E−15
22nd Surface
K = 1.0000
A4 = 1.20392E−05, A6 = 9.97149E−09, A8 = 5.72997E−11, A10 = −1.32184E−14

[Lens Group Data]

| Group | First surface | Focal length | Magnification (Infinity) | Magnification (Short-distance) |
|---|---|---|---|---|
| 1 | 1 | 107.04 | 0 | −0.54706 |
| 2 | 5 | 81.32 | 0.45966 | 0.36636 |
| 3 | 11 | −68.42 | 2.90838 | 2.78708 |
| 4 | 13 | 78.85 | 0.35580 | 0.35530 |

[Variable Distance Data]

| | Infinity f = 50.910 | Short-distance P = −0.1985 |
|---|---|---|
| D0 | ∞ | 289.75 |
| D4 | 1.000 | 14.500 |
| D10 | 1.000 | 9.611 |
| D12 | 10.802 | 2.191 |
| D24 | 1.001 | 1.040 |

[First lens group Cofiguration Data]

| | Focal length | R1 | R2 |
|---|---|---|---|
| First lens | −96.96346 | −45.53128 (1st Surface) | −111.79675 (2nd Surface) |
| Second lens | 54.54273 | 83.73710 (3rd Surface) | −49.75520 (4th Surface) |

[Air Lens Data]
Rear Group Air Convex Lens
R1=26.87419 (19th Surface), R2=−34.55237 (20th Surface), Shape Factor=0.124997721

Figure 16A:
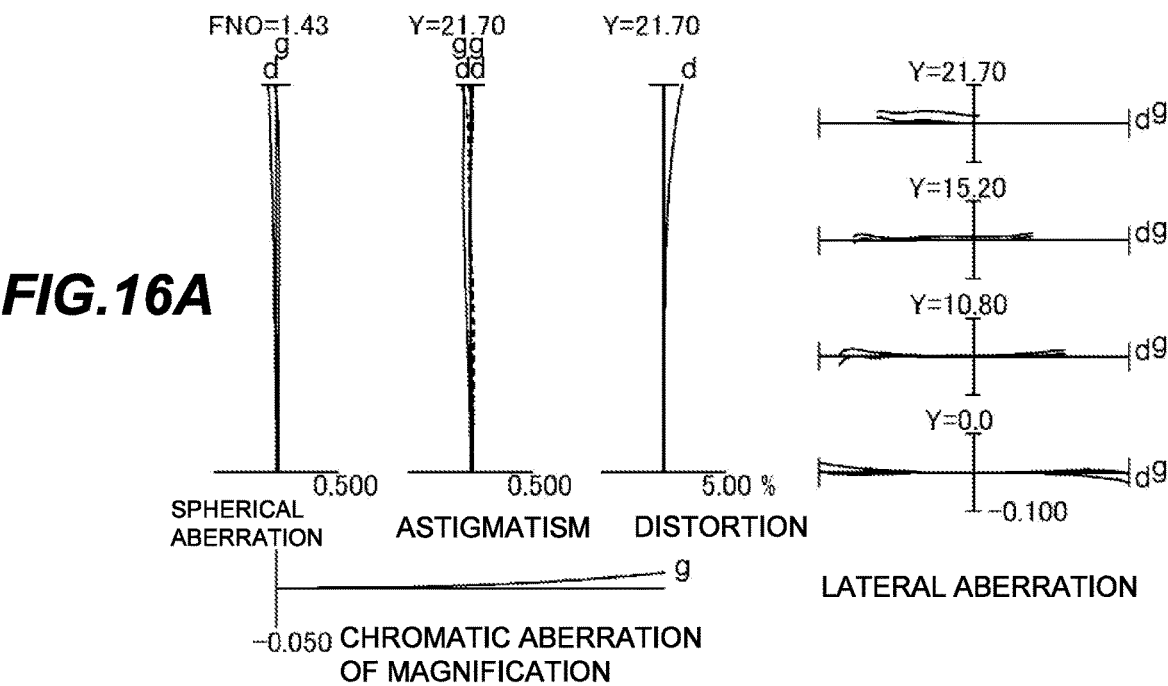
FIGS. 16A and 16B are diagrams of various aberrations of the optical system according to the Example 8, where
Figure 16B:
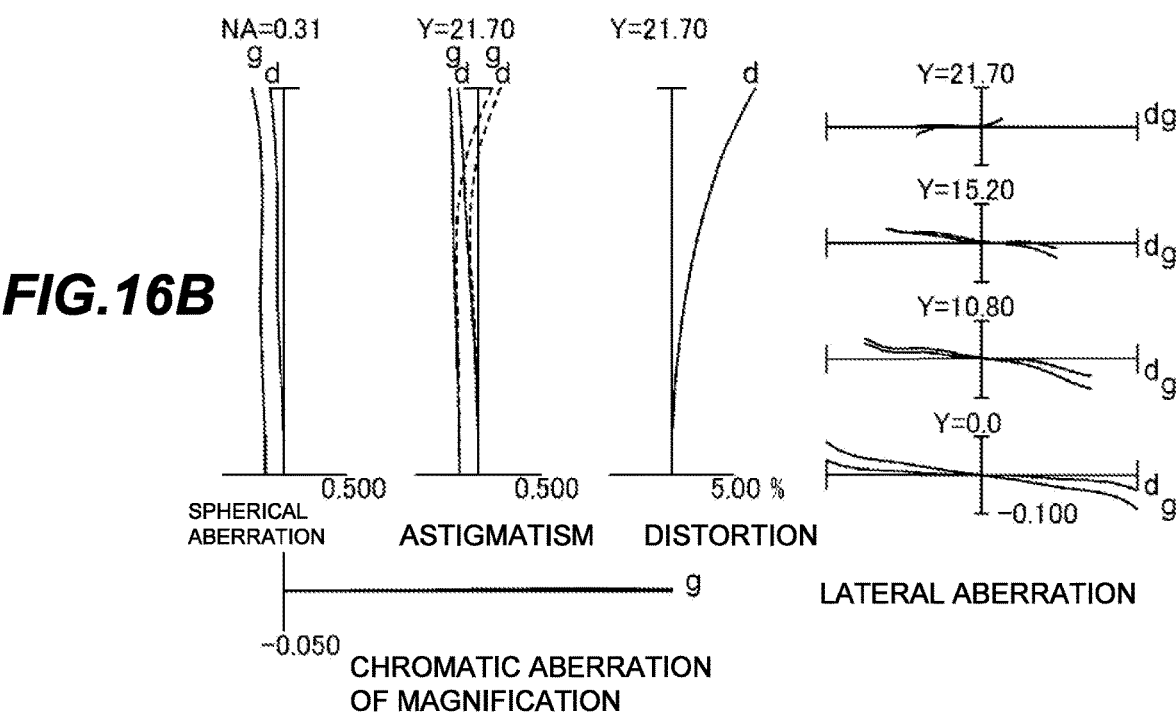

FIGS. 16A and 16B show various aberration values of the optical system according to the Example 8 upon focusing on an infinity object and upon focusing on a short distant object, respectively. From each aberration diagram, it can be seen that the optical system according to the Example 8 excellently corrects various aberrations and has excellent image formation performance.

The following shows a list of conditional expressions and conditional expression corresponding values of the respective examples.

[List of Conditional Expressions]

$\beta F1/\beta F2$ (1)

$fF1/fF2$ (2)

$(-MVF1)/MVF$ (3)

$fF1/f$ (4)

$fF2/f$ (5)

$\beta F1$ (6)

$1/\beta F2$ (7)

$\{\beta F1+(1/\beta F1)\}^{-2}$ (8)

$\{\beta F2+(1/\beta F2)\}^{-2}$ (9)

$(-fM)/f$ (10)

$fR/f$ (11)

$fF2/fR$ (12)

$-(r2Lm+r1Lm)/(r2Lm-r1Lm)$ (13)

$(r2Lp+r1Lp)/(r2Lp-r1Lp)$ (14)

$NAm/NAi$ (15)

$(r2L1+r1L1)/(r2L1-r1L1)$ (16)

$(r2Lr+r1Lr)/(r2Lr-r1Lr)$ (17)

$2\omega°)$ (18)

$BFa/f$ (19)

Conditional Expression Corresponding Values

|      | Example 1 | Example 2 | Example 3 | Example 4 |
|------|-----------|-----------|-----------|-----------|
| (1)  | −0.0986   | 0.0024    | −0.0128   | −0.0527   |
| (2)  | 2.0165    | 0.8302    | 1.1938    | 2.1809    |
| (3)  | 1.1483    | 6.5324    | 2.4310    | 2.6995    |
| (4)  | 3.2371    | 2.0682    | 2.5868    | 3.4459    |
| (5)  | 1.6053    | 2.4912    | 2.1668    | 1.5800    |
| (6)  | −1.2952   | 0.2870    | 0.2909    | 0.2363    |
| (7)  | 0.0762    | 0.0082    | −0.0441   | −0.2230   |
| (8)  | 0.2340    | 0.0703    | 0.0719    | 0.0501    |
| (9)  | 0.0057    | 6.76E−5   | 0.0019    | 0.0451    |
| (10) | 1.0109    | 0.8382    | 0.9050    | 0.9932    |
| (11) | 1.4600    | 1.3006    | 1.3838    | 2.0838    |
| (12) | 1.0995    | 1.9154    | 1.5658    | 0.7582    |
| (13) | 0.1944    | 0.9906    | 0.9273    | 0.3591    |
| (14) | 0.5184    | 0.1209    | 0.1315    | 0.1103    |
| (15) | 1.117     | 1.056     | 1.089     | 1.147     |
| (16) | —         | —         | —         | —         |
| (17) | —         | —         | —         | —         |
| (18) | 63.6      | 64.6      | 64.6      | 64.6      |
| (19) | 0.4391    | 0.4162    | 0.4357    | 0.6414    |

|      | Example 5 | Example 6 | Example 7 | Example 8 |
|------|-----------|-----------|-----------|-----------|
| (1)  | −0.0295   | 0.0100    | 0.0742    | 0         |
| (2)  | −3.8102   | −2.1100   | −1.2709   | −1.5645   |
| (3)  | 2.0216    | 1.2312    | 1.9334    | 1.5678    |
| (4)  | 4.2629    | 2.5791    | 1.7482    | 2.1025    |
| (5)  | −1.1188   | −1.2224   | −1.3756   | −1.3439   |
| (6)  | −0.0916   | 0.0345    | 0.2951    | 0         |
| (7)  | 0.3223    | 0.2901    | 0.2513    | 0.3438    |
| (8)  | 0.0082    | 0.0012    | 0.0737    | 0         |
| (9)  | 0.0853    | 0.0716    | 0.0559    | 0.0945    |
| (10) | −1.1403   | −1.7253   | −5.3026   | −1.5973   |
| (11) | 1.8612    | 1.6071    | 1.3585    | 1.5488    |
| (12) | −0.6011   | −0.7606   | −1.0126   | −0.8677   |
| (13) | —         | —         | —         | —         |
| (14) | —         | —         | —         | —         |
| (15) | —         | —         | —         | —         |
| (16) | 2.3679    | 2.5471    | 2.2582    | 2.3742    |
| (17) | 0.9104    | 0.2260    | 0.3401    | 0.1250    |
| (18) | 64.4      | 64.4      | 66.0      | 45.6      |
| (19) | 0.4163    | 0.3840    | 0.3840    | 0.3047    |

According to each of the above-described examples, by reducing the size and weight of the focusing lens groups, it is possible to achieve an optical system that can realize high-speed AF and quietness during AF without increasing the size of the lens barrel, and excellently suppress aberration fluctuations upon focusing from an infinity object onto a short distant object.

The invention of the present application is not limited to the above embodiment, and can be appropriately modified as long as the optical performance specified by the recitations in Claims is not impaired. In each of the above examples, the four-group configuration and the five-group configuration are shown, but the invention of the present application may have other group configurations. For example, the invention of the present application may be configured so that a lens or a lens group are added at a position closest to the object or the image surface in the optical system of each of the above examples. Here, the lens group is a portion having at least one lens which is separated with an air distance that changes upon focusing.

Further, any of a spherical surface, a flat surface, and an aspherical surface may be adopted as the lens surface of the lens constituting the optical system of the present application. The lens surface having a spherical surface or a flat surface has advantageous that lens processing and assembly adjustment are facilitated, deterioration of optical performance caused by errors in lens processing and assembly adjustment can be prevented, and deterioration in depiction performance is less even if the image surface shifts. The lens surface having an aspherical surface may be an aspherical surface obtained by grinding, a glass mold aspherical surface formed by molding glass into an aspherical shape with a mold, or a composite type aspherical surface formed by forming a resin provided on the glass surface into an aspherical shape. Further, the lens surface may be a diffraction surface, and the lens may be a refractive index distribution type lens (GRIN lens) or a plastic lens.

Further, the lens surface of the lens constituting the optical system of the present application may be provided with an antireflection film having a high transmittance in a wide wavelength range. As a result, flare and ghost can be reduced, and high-contrast and high optical performance can be achieved.

EXPLANATION OF NUMERALS AND CHARACTERS

G1 first lens group
G2 second lens group
G3 third lens group
G4 fourth lens group
G5 fifth lens group
I image surface
S aperture stop

The invention claimed is:

1. An optical system consisting of a plurality of lens groups including a first focusing lens group and a second focusing lens group which are arranged along an optical axis, wherein
the second focusing lens group is provided at a position closer to an image surface than the first focusing lens group,
the first focusing lens group moves in a direction to an object along the optical axis upon focusing on from an infinity object to a short distant object,
the second focusing lens group moves in a direction to an image surface along the optical axis upon focusing on from an infinity object to a short distant object, and
the following conditional expression is satisfied:

$$-0.20<\beta F1/\beta F2<0.50,$$

where
$\beta F1$: a lateral magnification of the first focusing lens group upon focusing on the infinity object, and
$\beta F2$: a lateral magnification of the second focusing lens group upon focusing on the infinity object.

2. The optical system according to claim 1, wherein the following conditional expression is satisfied:

$$-4.50<fF1/fF2<3.00,$$

where
fF1: a focal length of the first focusing lens group, and
fF2: a focal length of the second focusing lens group.

3. The optical system according to claim 1, wherein the following conditional expression is satisfied:

$$0.50<(-MVF1)/MVF2<7.00,$$

where
MVF1: a movement amount of the first focusing lens group upon focusing from the infinity object onto the short distant object, and
MVF2: a movement amount of the second focusing lens group upon focusing from the infinity object onto the short distant object (the movement amounts represent movements in the direction to the image surface with positive values).

4. The optical system according to claim 1, wherein the following conditional expression is satisfied:

$$1.30<fF1/f<5.00,$$

where
fF1: a focal length of the first focusing lens group, and
f: a focal length of the entire optical system.

5. The optical system according to claim 1, wherein the following conditional expression is satisfied:

$$-2.00<fF2/f<-0.05, \text{ or } 0.05<fF2/f<3.00,$$

where
fF2: a focal length of the second focusing lens group, and
f: a focal length of the entire optical system.

6. The optical system according to claim 1, wherein the following conditional expression is satisfied:

$$-1.80<\beta F1<0.60,$$

where
$\beta F1$: the lateral magnification of the first focusing lens group upon focusing on the infinity object.

7. The optical system according to claim 1, wherein the following conditional expression is satisfied:

$$-0.60<1/\beta F2<0.70,$$

where
$\beta F2$: the lateral magnification of the second focusing lens group upon focusing on the infinity object.

8. The optical system according to claim 1, wherein the following conditional expression is satisfied:

$$\{\beta F1+(1/\beta F1)\}^{-2}<0.250,$$

where
$\beta F1$: the lateral magnification of the first focusing lens group upon focusing on the infinity object.

9. The optical system according to claim 1, wherein the following conditional expression is satisfied:

$$\{\beta F2+(1/\beta F2)\}^{-2}<0.160,$$

where
$\beta F2$: the lateral magnification of the second focusing lens group upon focusing on the infinity object.

10. The optical system according to claim 1,
consisting of a front lens group including the first focusing lens group, an intermediate lens group, the second focusing lens group, and a rear lens group having positive refractive power, which are arranged in this order closest to the object, wherein
the first focusing lens group is arranged at a position closest to the image surface in the front lens group.

11. The optical system according to claim 1,
consisting of a front lens group including the first focusing lens group, an intermediate lens group, the second focusing lens group, and a rear lens group having positive refractive power, which are arranged in this order closest to the object, wherein
the intermediate lens group and the second focusing lens group have different signs in refractive power.

12. The optical system according to claim 1,
further comprising an intermediate lens group to be arranged between the first focusing lens group and the second focusing lens group, wherein
the following conditional expression is satisfied:

$$-8.00<(-fM)/f<2.00,$$

where
fM: a focal length of the intermediate lens group, and
f: a focal length of the entire optical system.

13. The optical system according to claim 1,
further comprising a rear lens group which is arranged on the image surface side of the second focusing lens group and has positive refractive power, wherein
the following conditional expression is satisfied:

$$0.50<fR/f<3.50,$$

where
fR: a focal length of the rear lens group, and
f: a focal length of the entire optical system.

14. The optical system according to claim 1,
further comprising a rear lens group which is arranged on the image surface side of the second focusing lens group and has positive refractive power, wherein
the following conditional expression is satisfied:

$$-2.00 < fF2/fR < 3.00,$$

where
fF2: a focal length of the second focusing lens group, and
fR: a focal length of the rear lens group.

15. The optical system according to claim 1, wherein
a lens arranged at a position closest to the object is a negative meniscus lens.

16. The optical system according to claim 1,
further comprising an intermediate lens group to be arranged between the first focusing lens group and the second focusing lens group, wherein
the intermediate lens group is configured so that at least one air lens having positive refractive power is formed, and
the following conditional expression is satisfied:

$$0.10 < -(r2Lm+r1Lm)/(r2Lm-r1Lm) < 1.20,$$

where
r1Lm: a radius of curvature of a surface on an object side of an air lens closest to the image surface among air lenses formed in the intermediate lens group, and
r2Lm: a radius of curvature of a surface on an image surface side of an air lens closest to the image surface among the air lenses formed in the intermediate lens group.

17. The optical system according to claim 1,
further comprising a leading lens group arranged on the object side of the first focusing lens group, wherein
the leading lens group includes a negative meniscus lens and a negative lens arranged in this order closest to the object,
an air lens is formed between the negative meniscus lens and the negative lens, and
the following conditional expression is satisfied:

$$0 < (r2Lp+r1Lp)/(r2Lp-r1Lp) < 1.20,$$

where
r1Lp: a radius of curvature of a surface on the object side of the air lens formed in the leading lens group, and
r2Lp: a radius of curvature of a surface on the image surface side of the air lens formed in the leading lens group.

18. The optical system according to claim 1, wherein
the following conditional expression is satisfied:

$$1.00 < NAm/NAi < 1.50,$$

where
NAi: a numerical aperture on the image side upon focusing on the infinity object, and
NAm: a numerical aperture on the image side upon focusing on the short distant object.

19. The optical system according to claim 1, wherein
a lens arranged at a position closest to the object among lenses constituting the first focusing lens group is a negative lens, and
the following conditional expression is satisfied:

$$1.50 < (r2L1+r1L1)/(r2L1-r1L1) < 3.50,$$

where
r1L1: a radius of curvature of a surface on the object side of the negative lens, and
r2L1: a radius of curvature of a surface on the image surface side of the negative lens.

20. The optical system according to claim 1,
further comprising a rear lens group which is arranged on the image surface side of the second focusing lens group and has positive refractive power, wherein
the rear lens group is configured to form an air lens, and
the following conditional expression is satisfied:

$$0.00 < (r2Lr+r1Lr)/(r2Lr-r1Lr) < 1.20,$$

where
r1Lr: a radius of curvature of a surface on the object side of the air lens formed in the rear lens group, and
r2Lr: a radius of curvature of a surface on the image surface side of the air lens formed in the rear lens group.

21. The optical system according to claim 1, wherein
the following conditional expression is satisfied:

$$25.00° < 2\omega < 75.00°,$$

where
$2\omega$: a total angle of view of the optical system.

22. The optical system according to claim 1, wherein
the following conditional expression is satisfied:

$$0.10 < BFa/f < 0.75,$$

where
BFa: a back focus (air equivalent length) of the optical system, and
f: a focal length of the entire optical system.

23. An optical apparatus comprising the optical system according to claim 1.

24. The optical system according to claim 1, wherein
the first focusing lens group has positive refractive power.

25. A method for manufacturing an optical system comprising:
configuring each of a plurality of lens groups including a first focusing lens group and a second focusing lens group: and
arranging the configured lens groups in a lens barrel so that;
the first focusing lens group and the second focusing lens group are arranged along an optical axis;
the second focusing lens group is provided at a position closer to an image surface than the first focusing lens group;
the first focusing lens group has positive refractive power and moves in a direction to an object along the optical axis upon focusing on from an infinity object to a short distant object;
the second focusing lens group moves in a direction to an image surface along the optical axis upon focusing on from an infinity object to a short distant object; and
the first focusing lens group and the second focusing lens group satisfy the following conditional expression:

$$-0.20 < \beta F1/\beta F2 < 0.50,$$

where
$\beta F1$: a lateral magnification of the first focusing lens group, and
$\beta F2$: a lateral magnification of the second focusing lens group.

* * * * *